United States Patent
Kon et al.

(10) Patent No.: US 9,472,978 B2
(45) Date of Patent: Oct. 18, 2016

(54) POWER STORAGE CONTROL APPARATUS AND POWER STORAGE CONTROL METHOD

(75) Inventors: Takayasu Kon, Tokyo (JP); Tomoyuki Ono, Saitama (JP); Kei Yamashita, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 1070 days.

(21) Appl. No.: 13/617,974

(22) Filed: Sep. 14, 2012

(65) Prior Publication Data

US 2013/0079944 A1   Mar. 28, 2013

(30) Foreign Application Priority Data

Sep. 26, 2011   (JP) ................ 2011-208993

(51) Int. Cl.
| | |
|---|---|
| *G05D 3/12* | (2006.01) |
| *G05D 5/00* | (2006.01) |
| *G05D 9/00* | (2006.01) |
| *G05D 11/00* | (2006.01) |
| *G05D 19/00* | (2006.01) |
| *H02J 7/34* | (2006.01) |
| *H02J 7/35* | (2006.01) |

(52) U.S. Cl.
CPC ... *H02J 7/34* (2013.01); *H02J 7/35* (2013.01)

(58) Field of Classification Search
CPC ........ H02J 3/14; H02J 13/0075; H04Q 9/00; H04Q 2209/43; H04Q 2209/886; Y04S 30/12; Y02T 90/168
USPC .......................... 700/286, 287, 291, 295, 297
See application file for complete search history.

(56) References Cited

U.S. PATENT DOCUMENTS

| | | | | | |
|---|---|---|---|---|---|
| 5,963,457 | A | * | 10/1999 | Kanoi .................. | H02J 3/00 340/870.03 |
| 2008/0106146 | A1 | * | 5/2008 | Baek .................. | G01D 4/004 307/35 |
| 2012/0053742 | A1 | * | 3/2012 | Tsuda .................. | B60L 11/1842 700/291 |
| 2012/0323390 | A1 | * | 12/2012 | Kobayasi .............. | H02J 3/14 700/295 |
| 2013/0131883 | A1 | * | 5/2013 | Yamada ................ | H02J 3/14 700/295 |
| 2014/0201110 | A1 | * | 7/2014 | Sato .................... | G01R 21/133 705/412 |
| 2014/0288724 | A1 | * | 9/2014 | Noguchi .............. | H01M 8/04925 700/297 |
| 2015/0039149 | A1 | * | 2/2015 | Forbes, Jr. ........... | G06Q 10/00 700/296 |

FOREIGN PATENT DOCUMENTS

JP   2010-213507   9/2010

* cited by examiner

*Primary Examiner* — Ronald Hartman, Jr.
(74) *Attorney, Agent, or Firm* — Chip Law Group

(57) ABSTRACT

The present disclosure is generally directed to a power storage control methods and apparatus including, for example, a power storage control unit configured to determine a connection state of a consumption apparatus with a power supply, determine an expected amount of power usage by the consumption apparatus in a connected state, and adjusting a target value of power storage for a power storage apparatus based on a change in connection state and the expected amount of power usage by the consumption apparatus. The present disclosure may be also be embodied a consumption apparatus.

40 Claims, 14 Drawing Sheets

| NAME OF APPARATUS | BATTERY CONSUMPTION AMOUNT |
|---|---|
| APPARATUS #1 | $\triangle C_1$ |
| APPARATUS #2 | $\triangle C_2$ |
| APPARATUS #3 | $\triangle C_3$ |
| ⋮ | ⋮ |

| BATTERY CAPACITY | BATTERY CONSUMPTION AMOUNT |
|---|---|
| $C_1$ | $\triangle C_1$ |
| $C_2$ | $\triangle C_2$ |
| $C_3$ | $\triangle C_3$ |
| ⋮ | ⋮ |

S102: PROCESS OF SEPARATION TIME

S104: PROCESS OF NORMAL TIME

USE HISTORY

| NAME OF APPARATUS | BATTERY CAPACITY | (REMAINING LEVEL OF SEPARATION TIME) | (REMAINING LEVEL OF CONNECTION TIME) | BATTERY CONSUMPTION AMOUNT |
|---|---|---|---|---|
| APPARATUS #1 | $C_1$ | 90% | 30% | $C_1 \times 0.6$ |
| APPARATUS #1 | $C_1$ | 75% | 25% | $C_1 \times 0.5$ |
| APPARATUS #2 | $C_2$ | 100% | 50% | $C_2 \times 0.5$ |
| APPARATUS #2 | $C_2$ | 80% | 40% | $C_2 \times 0.4$ |
| ⋮ | ⋮ | ⋮ | ⋮ | ⋮ |

USE HISTORY (MODIFIED EXAMPLE)

| NAME OF USER | NAME OF APPARATUS | BATTERY CAPACITY | BATTERY CONSUMPTION AMOUNT |
|---|---|---|---|
| USER #1 | APPARATUS #1 | $C_1$ | $C_1 \times 0.6$ |
| USER #1 | APPARATUS #1 | $C_1$ | $C_1 \times 0.5$ |
| USER #2 | APPARATUS #1 | $C_1$ | $C_1 \times 0.5$ |
| USER #3 | APPARATUS #2 | $C_2$ | $C_2 \times 0.4$ |
| ⋮ | ⋮ | ⋮ | ⋮ |

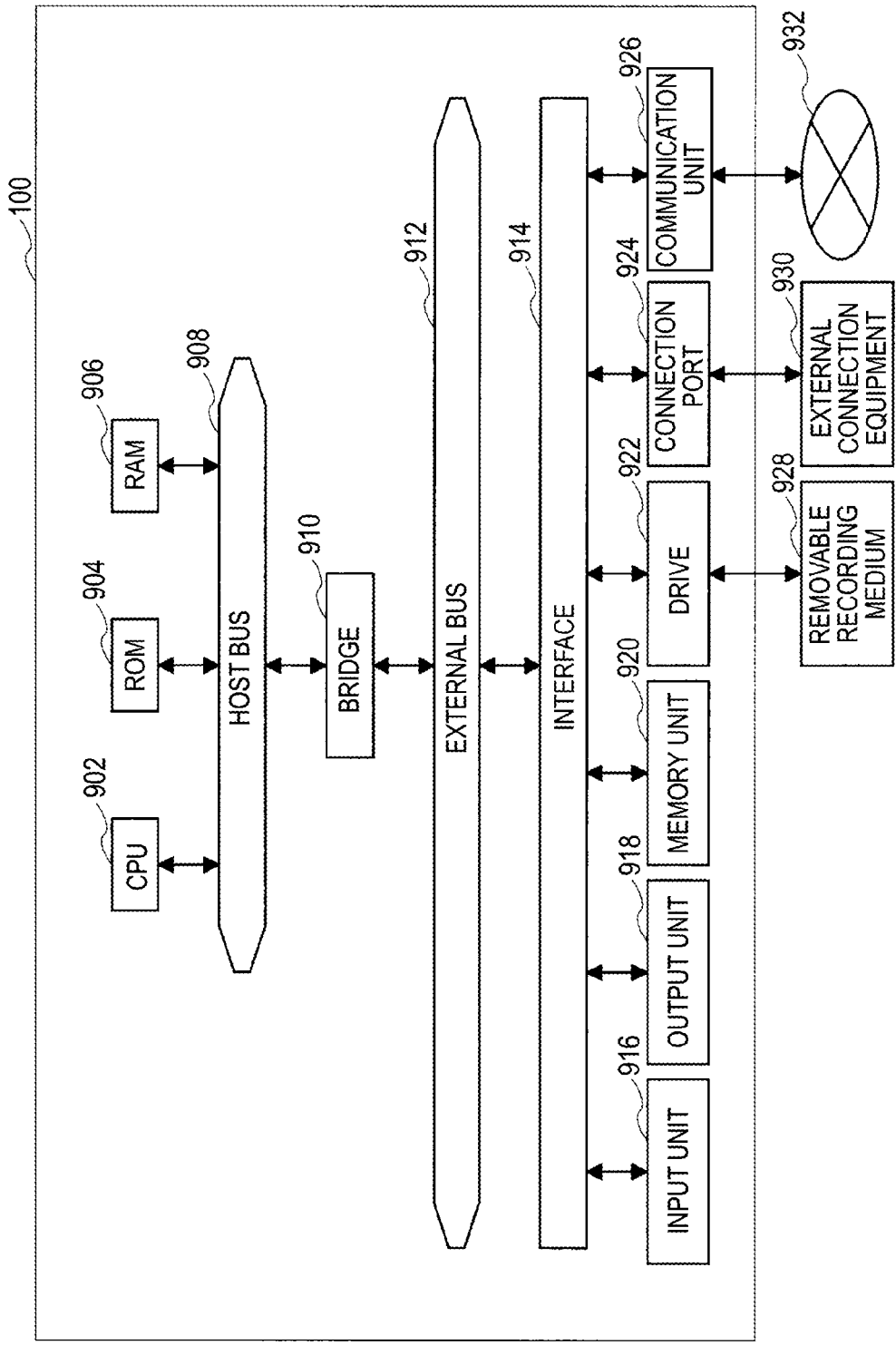

POWER STORAGE CONTROL APPARATUS AND POWER STORAGE CONTROL METHOD

CROSS REFERENCES TO RELATED APPLICATIONS

The present application claims priority to Japanese Patent Application No. 2011-208993 filed on Sep. 26, 2011, the entire disclosure of which is incorporated herein by reference.

BACKGROUND

The present technology relates to a power storage control apparatus and a power storage control method.

People have recently been interested in natural energy thanks to increasing awareness of global environmental protection and the fossil fuel exhaustion crisis. Examples of the natural energy include hydraulic power, geothermal power, solar light, solar heat, sea tide, wind power, and biomass. Therefore, natural energy can be generated without generation of the greenhouse effect. Technologies of efficiently using the power generated from the natural energy have been developed everywhere in proportion to the interest of the people in natural energy. For example, Japanese Unexamined Patent Application Publication No. 2010-213507 discloses a power storage control method of efficiently storing the power generated from the natural energy on a battery by the use of weather information.

SUMMARY

However, when an apparatus (hereinafter, referred to as a consumption apparatus), such as an electric vehicle, an electric scooter, or an electric bicycle, for which power storage is to be controlled is separated from a system, the power storage control of the apparatus may not be in operation. For example, when efficient power storage control is performed based on the power consumption of an apparatus connected to the system, for example, the power unconsumed by the apparatus is sold as surplus power to a power company or the like. However, when a consumption apparatus is connected to the system, it can be considered that unexpected power consumption in the power storage control may occur (for example, charging of a battery), and thus there is a possibility that the consumed power is not supplemented with the power stored in the secondary cell. That is, with the power storage control, the natural energy is not efficiently used.

It is therefore desirable to provide a novel and improved power storage control apparatus and a novel and improved power storage control method capable of realizing a more suitable natural energy use environment.

An example embodiment of the present technology is directed to a power storage control apparatus including a connection monitoring unit that monitors a connection state between a power feeding terminal configured to receive power from a power generation apparatus generating power using natural energy or a power storage apparatus storing the power generated by the power generation apparatus and a consumption apparatus that mounts a battery and operates using power stored in the battery and a power storage control unit that adjusts an amount of power to be stored in the power storage apparatus. The power storage control unit adjusts the amount of power to be stored in the power storage apparatus in consideration of an amount of power to be consumed by the separated consumption apparatus when the consumption apparatus connected to the power feeding terminal is separated from the power feeding terminal.

Another example embodiment of the present technology is directed to a power storage control method including monitoring a connection state between a power feeding terminal configured to receive power from a power generation apparatus generating power using natural energy or a power storage apparatus storing the power generated by the power generation apparatus and a consumption apparatus that mounts a battery and operates using power stored in the battery, and adjusting an amount of power to be stored in the power storage apparatus. In the adjusting of the amount of power, the amount of power to be stored in the power storage apparatus is adjusted in consideration of an amount of power to be consumed by the separated consumption apparatus when the consumption apparatus connected to the power feeding terminal is separated from the power feeding terminal.

In an example embodiment, a power storage control apparatus includes a power storage control unit configured to (a) determine a connection state of a consumption apparatus with a power supply, (b) determine an expected amount of power usage by the consumption apparatus in a connected state, and (c) adjusting a target value of power storage for a power storage apparatus based on a change in connection state and the expected amount of power usage by the consumption apparatus.

According to the embodiments of the present technology described above, it is possible to realize a more suitable natural energy use environment.

Additional features and advantages are described herein, and will be apparent from the following Detailed Description and the figures.

BRIEF DESCRIPTION OF THE FIGURES

FIG. 20 is a diagram illustrating an example of a realizable hardware configuration of the system control apparatus according to the first to fourth embodiments of the present technology.

DETAILED DESCRIPTION

Figure 1:
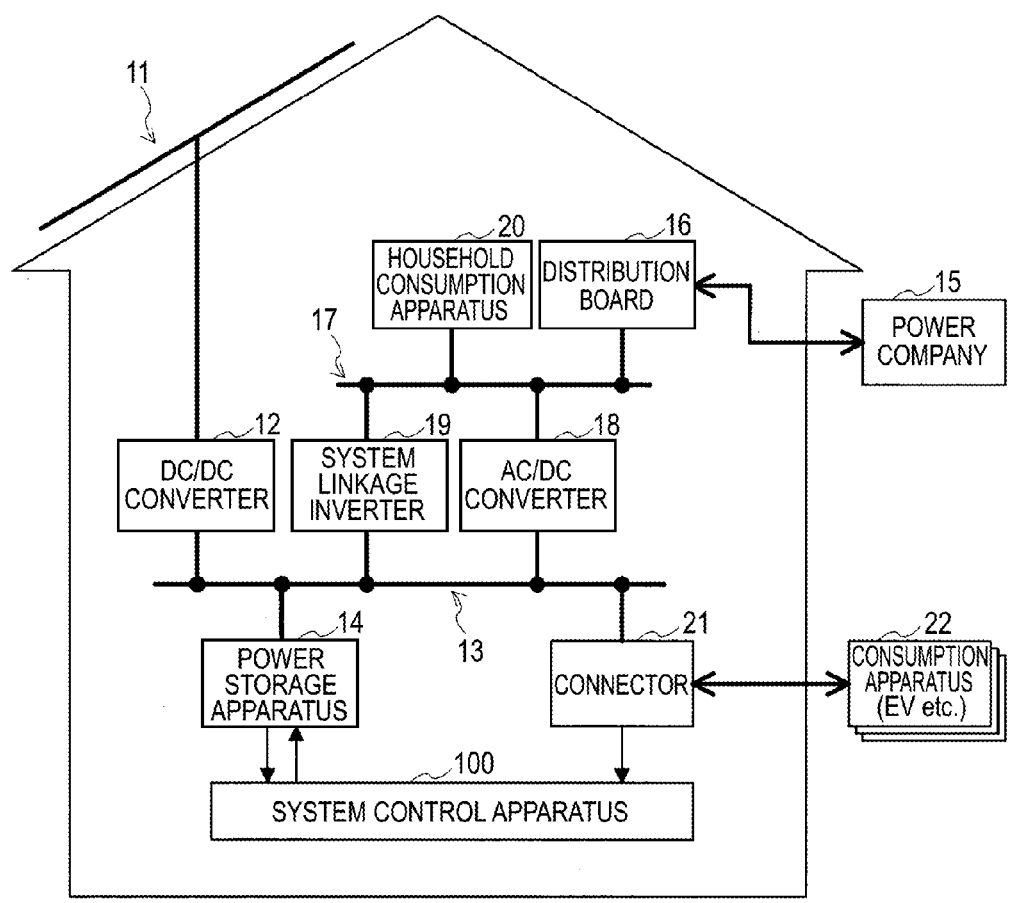
FIG. 1 is a diagram illustrating an example of the configuration of a power system.

Embodiments of the present application will be described below in detail with reference to the drawings. Further, throughout the specification and the drawings, the same reference numerals are given to constituent elements having substantially the same functional configuration.

Description Flow

Here, the flow of the following description will be described in brief.

First, an example of the configuration of a power system will be described. Next, an example of the configuration of a consumption apparatus 22 will be described with reference to FIGS. 2 and 3. Next, the configuration and the process of a system control apparatus 100 according to a first embodiment of the present technology will be described with reference to FIGS. 4 to 9. Next, the configuration and the process of the system control apparatus 100 according to a second embodiment of the present technology will be described with reference to FIGS. 10 to 13. Next, the configuration and the process of the system control apparatus 100 according to a third embodiment of the present technology will be described with reference to FIGS. 14 to 16. Next, the configuration and the process of the system control apparatus 100 according to a fourth embodiment of the present technology will be described with reference to FIGS. 17 to 19.

Next, an example of a hardware configuration configured to realize the functions of the system control apparatus 100 according to the first to fourth embodiments of the present technology will be described with reference to FIG. 20. Finally, methods in combinations of the first to fourth embodiments and technical spirit of the embodiments are summarized and operation effects obtained from the technical spirit will be described in brief.

Description Contents
1: Introduction
   1-1: Configuration of Power System
   1-2: Configuration of Consumption Apparatus 22
   1-3: Efficient Use of Natural Energy 2: First Embodiment (Amount of Consumption of Battery When Consumption Apparatus Is Separated: Fixed Value)
   2-1: Configuration of System Control Apparatus 100
   2-2: Process of System Control apparatus 100
3: Second Embodiment (Amount of Consumption of Battery When Consumption Apparatus Is Separated: Estimation from Use History)
   3-1: Configuration of System Control Apparatus 100
   3-2: Process of System Control apparatus 100
   3-3: (Modified Example) Configuration for Distinguishing Users from Each Other
4: Third Embodiment (Amount of Consumption of Battery When Consumption Apparatus Is Separated: Reception through Communication)
   4-1: Configuration of System Control Apparatus 100
   4-2: Process of System Control apparatus 100
5: Fourth Embodiment (Amount of Consumption of Battery When Consumption Apparatus Is Separated: Estimation from Setting of Destination)
   5-1: Configuration of System Control Apparatus 100
   5-2: Process of System Control apparatus 100
6: Example of Hardware Configuration of System Control Apparatus 100
7: Brief
   7-1: Combinations of Embodiments
   7-2: Expression of Technical Spirit 1: Introduction First, an example of the configurations of a power system and a consumption apparatus 22 according to example embodiments described below will be described. Here, the example of the configurations described here are given for the purpose of understanding of the contents of the embodiments. Accordingly, it should be appreciated that the application range of the embodiments of the present technology are not limited to the examples of the configuration. For example, a household power system will be exemplified here, but the embodiments of the present technology are applicable to power systems used in companies, factories, or the like other than houses.

1-1: Configuration of Power System

First, an example of the configuration of a power system will be described with reference to FIG. 1. FIG. 1 is a diagram illustrating an example of the configuration of the power system.

As shown in FIG. 1, for example, the power system includes a photovoltaic panel 11, a DC/DC converter 12, a power bus 13, and a power storage apparatus 14. The power system further includes a distribution board 16, a power bus 17, an AC/DC converter 18, a system linkage inverter 19, a household consumption apparatus 20, a connector 21, and a system control apparatus 100. The distribution board 16 is supplied with system power from a power company 15. A consumption apparatus 22 detachably mounted on the power system can be connected to the connector 21. A connector 21 may employ any suitable connection type for power transfer between the connector 21 and the consumption apparatus 22, including but not limited to, a direct connection (e.g., a wired plug-in connection), a wireless connection (e.g., a resonant coupling). Thus, the connector 21 does not require any direct connection or mounting of the consumption apparatus 22 with the connector 21.

The photovoltaic panel 11 is an example of power generation equipment that generates power from natural energy. Another power generation equipment such as wind power generation equipment, hydraulic power generation equipment, geothermal power generation equipment, or biomass power generation equipment can be used as the power generation equipment. Here, to facilitate the description, it is assumed that the photovoltaic panel 11 is used. The power generated by the photovoltaic panel 11 is supplied to the power bus 13 via the DC/DC converter 12. The power supplied to the power bus 13 is accumulated in the power storage apparatus 14, is supplied to the consumption apparatus 22 connected to the connector 21, or is supplied to the power bus 17 via the system linkage inverter 19.

The power supplied to the power bus 17 is consumed by the household consumption apparatus 20 connected to the power bus 17 or is sold to the power company 15 via the distribution board 16. A meter that measures the amount of input or output power is mounted on the distribution board 16. System power supplied from the power company 15 is supplied to the power bus 17 via the distribution board 16. The system power supplied to the power bus 17 is consumed by the household consumption apparatus 20 connected to the power bus 17 or is supplied to the power bus 13 via the AC/DC converter 18. Further, the system power supplied to the power bus 13 can be stored in the power storage apparatus 14 or is supplied to the consumption apparatus 22 connected to the connector 21.

The management of the power in the power system is performed by the system control apparatus 100. For example, the system control apparatus 100 determines the amount of power to be stored in the power storage apparatus 14 or determines the amount of power to be sold to the power company 15 in the power generated by the photovoltaic panel 11. Further, the system control apparatus 100 performs control such that the system power or the power generated by the photovoltaic panel 11 is supplied to the power storage apparatus 14, the household consumption apparatus 20, and the consumption apparatus 22 connected to the connector 21. The configuration of the system control apparatus 100 will be described in detail later.

The example of the configuration of the power system has hitherto been described. The household consumption apparatus 20 is any apparatus, such as home appliances, that is installed home and consumes power. The consumption apparatus 22 is an apparatus, such as an electric vehicle, an electric scooter, an electric bicycle, a cellular phone, a portable information terminal, a portable game console, or a portable battery, that can be separated from the power system. Hereinafter, to facilitate the description, it is assumed that the consumption apparatus 22 is an electric moving object (EV).

1-2: Configuration of Consumption Apparatus 22

Figure 2:
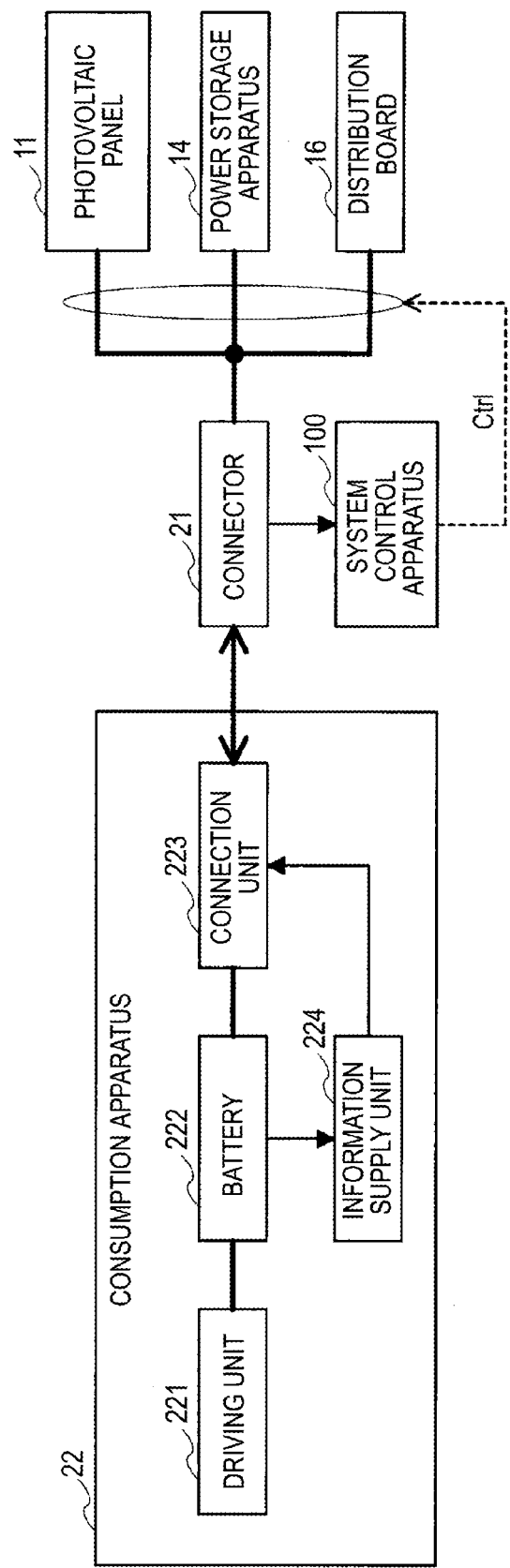
FIG. 2 is a diagram illustrating an example of the configuration of a consumption apparatus.

Next, an example of the configuration of the consumption apparatus 22 will be described with reference to FIG. 2. FIG. 2 is a diagram illustrating an example of the configuration of the consumption apparatus 22.

As shown in FIG. 2, for example, the consumption apparatus 22 includes a driving unit 221, a battery 222, a connection unit 223, and an information supply unit 224. The driving unit 221 is a driving unit that performs driving using the power stored in the battery 222. The connection unit 223 is a connection unit that is electrically and physically connected to the connector 21. For example, when the connector 21 is connected to the connection unit 223, the power is supplied to the battery 222 via the connection unit 223.

When the connection unit 223 is connected to the connector 21, the information supply unit 224 can transmit information to the system control apparatus 100 by power line communication. For example, the information supply unit 224 can transmit information regarding the remaining level of the battery 222 to the system control apparatus 100. Further, the information supply unit 224 can transmit the capacity of the battery 222, identification information used to specify the battery 222, identification information used to specify the consumption apparatus 22, and the like to the system control apparatus 100.

The information supply unit 224 may be configured to supply a function of car navigation device to the system control apparatus 100 or transmit information regarding a destination set by this function to the system control apparatus 100. Further, the information supply unit 224 may be configured to calculate the amount of power consumed by the separated consumption apparatus 22, which is separated from the power system, based on a use time of the consumption apparatus 22 set by a user, the information regarding the destination, or the like and transmit information regarding the amount of power to the system control apparatus 100. Furthermore, the information supply unit 224 may be configured to transmit identification information used to specify the user who uses the consumption apparatus 22 to the system control apparatus 100.

The configuration of the consumption apparatus 22 has hitherto been described.

Figure 3:
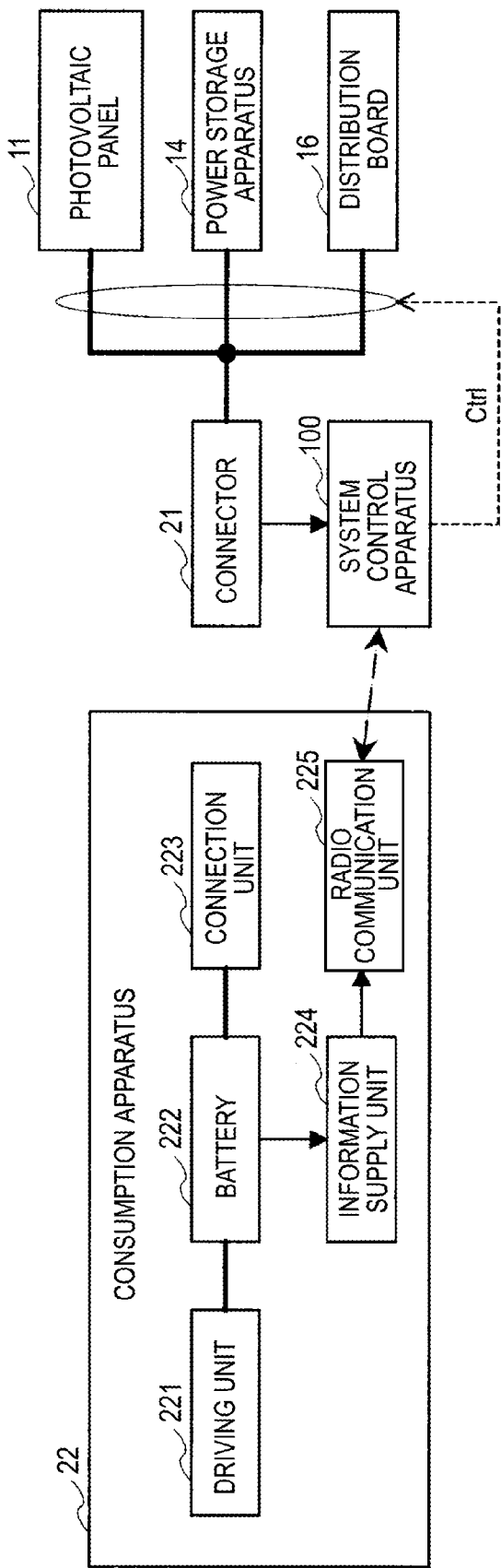
FIG. 3 is a diagram illustrating another example of the configuration of a consumption apparatus.

Modified Example: Configuration in which Radio Communication Function is Mounted Next, an example (modified example) of the configuration of the consumption apparatus 22 having a radio communication function will be described with reference to FIG. 3. FIG. 3 is a diagram illustrating an example (modified example) of the configuration of the consumption apparatus 22 having the radio communication function.

As shown in FIG. 3, the consumption apparatus 22 includes a driving unit 221, a battery 222, a connection unit 223, an information supply unit 224, and a radio communication unit 225. The driving unit 221 is a driving unit that performs driving using the power stored in the battery 222. The connection unit 223 is a connection unit that is electrically and physically connected to the connector 21. For example, when the connector 21 is connected to the connection unit 223, the power is supplied to the battery 222 via the connection unit 223. When the connection unit 223 is connected to the connector 21, the information supply unit 224 can transmit information to the system control apparatus 100 by power line communication. In an alternative embodiment, the connection unit 223 provides a wireless connection for power transfer to supply the battery 222.

Even when the connection unit 223 is separated from the connector 21, the information supply unit 224 can transmit information to the system control apparatus 100 via the radio communication unit 225. For example, the information supply unit 224 can transmit information regarding the remaining level of the battery 222 to the system control apparatus 100 using the radio communication function. Further, the information supply unit 224 can transmit the capacity of the battery 222, identification information used to specify the battery 222, identification information used to specify the consumption apparatus 22, and the like to the system control apparatus 100 using the radio communication function. Similarly, in an alternative embodiment when the connection unit 223 provides a wireless power supply connection, when the connection unit 223 is outside a range in which power transfer may suitably occur, the information supply unit 224 can transmit information to the system control apparatus 100 via the radio communication unit 225.

The information supply unit 224 may be configured to transmit information regarding a destination set by this function of the car navigation device to the system control apparatus 100 using the radio communication function. Further, the information supply unit 224 may be configured to calculate the amount of power consumed by the separated consumption apparatus 22, which is separated from the power system, based on a use time of the consumption apparatus 22 set by a user, the information regarding the destination, or the like and transmit information regarding the amount of power to the system control apparatus 100. Furthermore, the information supply unit 224 may be configured to transmit identification information used to specify the user who uses the consumption apparatus 22 to the system control apparatus 100.

The example (modified example) of the configuration of the consumption apparatus 22 having the radio communication function has hitherto been described.

1-3: Efficient Use of Natural Energy

Here, a method of realizing the efficient use of natural energy will be described. The amount of power generated by methods such as solar light power generation or wind power generation depends on the natural environments such as weather conditions. For example, in a day in which the duration of sunlight is long, a large amount of power can be obtained by the solar light power generation. Further, in a calm day, a small amount of power is obtained by wind power generation. Thus, since the amount of supply power generated from natural energy depends on the weather conditions, the amount of supply power is not stable.

Methods of using a secondary cell have been devised to resolve the unstable amount of supply power. For example, methods of storing the power generated by the solar light power generation in the daytime in secondary cells and using the power stored in the secondary cells in the night time have already been put to practical use. Further, when the amount of power exceeding the storage capacity of the secondary cell by the solar light power generation or the like is generated, methods of selling the surplus amount of power to power companies have been put to practical use. Furthermore, methods of estimating the amount of power consumed by consumption apparatuses connected to a power system and selling the amount of power exceeding the amount of consumed power to power companies have been devised.

However, it is supposed that the power storage control is performed on a consumption apparatus connected to a power system. Therefore, when the consumption apparatus is separated from the power system, for example, the amount of power consumed by the consumption apparatus or a battery charging operation performed when the consumption apparatus is connected to the power system is not omitted from targets of the storage control. Therefore, since the power to be consumed by a consumption apparatus may not be supplied only with the power stored in a secondary cell after the connection of the consumption apparatus to the power system, there is a concern that system power has to be used. Accordingly, the inventors of the present technology have devised a method of controlling the power storage in consideration of the amount of power to be consumed by a separated consumption apparatus separated from a power system when the consumption apparatus is separated. Hereinafter, this method will be described in detail.

2: First Embodiment (Amount of Consumption of Battery when Consumption Apparatus is Separated: Fixed Value)

A first example embodiment of the present technology will be described below.

2-1: Configuration of System Control Apparatus 100

Figures 4, 5, 6:
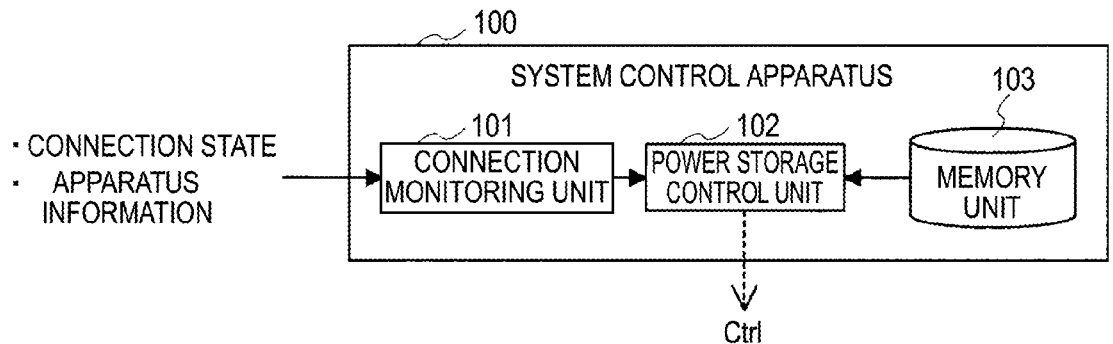
FIG. 4 is a diagram illustrating an example of the functional configuration of a system control apparatus according to a first embodiment of the present technology.
FIG. 5 is a diagram illustrating an example of the structure of apparatus information according to the first embodiment.
FIG. 6 is a diagram illustrating another example of the structure of apparatus information according to the first embodiment.

First, the configuration of the system control apparatus 100 according to this example embodiment will be described with reference to FIG. 4. FIG. 4 is a diagram illustrating the configuration of the system control apparatus 100 according to this embodiment.

As shown in FIG. 4, the system control apparatus 100 includes a connection monitoring unit 101, a power storage control unit 102, and a memory unit 103.

The connection monitoring unit 101 monitors a connection state between the connector 21 and the consumption apparatus 22. A connection state may be, for example, a directly connected state (e.g., a direct electrical connection is provided with a wired plug-in), a wirelessly connected state (e.g., a wireless power supply connection is provided using inductive coupling or resonant coupling), or a not connected state or separation state (e.g., no direct electrical power supply connection and no wireless power supply connection is currently available for use). It should be appreciated that the terms not connected state or separation state may be used interchangeably herein, when a physical separation occurs (e.g., unplugging) or a exiting a power transfer range occurs (e.g., removing from charging station). For example, when the consumption apparatus 22 is separated from the connector 21, the connection monitoring unit 101 inputs information (hereinafter, referred to as apparatus information) used to identify the separated consumption apparatus 22 or information (hereinafter, referred to as capacity information) regarding the battery capacity of the battery 222 mounted on the consumption apparatus 22 and information regarding the separation state into the power storage control unit 102. When the information regarding the separation state is input into the power storage control unit 102, the power storage control unit 102 determines the amount (hereinafter, a battery consumption amount) of power to be estimated by the separated consumption apparatus 22.

For example, the power storage control unit 102 reads consumption amount information (see FIG. 5), in which the names of apparatuses correspond to battery consumption amounts, from the memory unit 103 and determines the battery consumption amount corresponding to the separated consumption apparatus 22 based on the read consumption amount information. Alternatively, the power storage control unit 102 reads consumption amount information (see FIG. 6), in which battery capacities correspond to battery consumption amounts, from the memory unit 103 and determines the battery consumption amount corresponding to the separated consumption apparatus 22 based on the read consumption amount information. The power storage control unit 102 determining the battery consumption amount performs power storage control such that the extra amount of power excluding the determined battery consumption amount is stored in the power storage apparatus 14.

The configuration of the system control apparatus 100 according to this example embodiment has hitherto been described. Further, the battery consumption amount may be determined by a value obtained by applying the battery capacity by a predetermined ratio.

2-2: Process of System Control Apparatus 100

Figure 7:
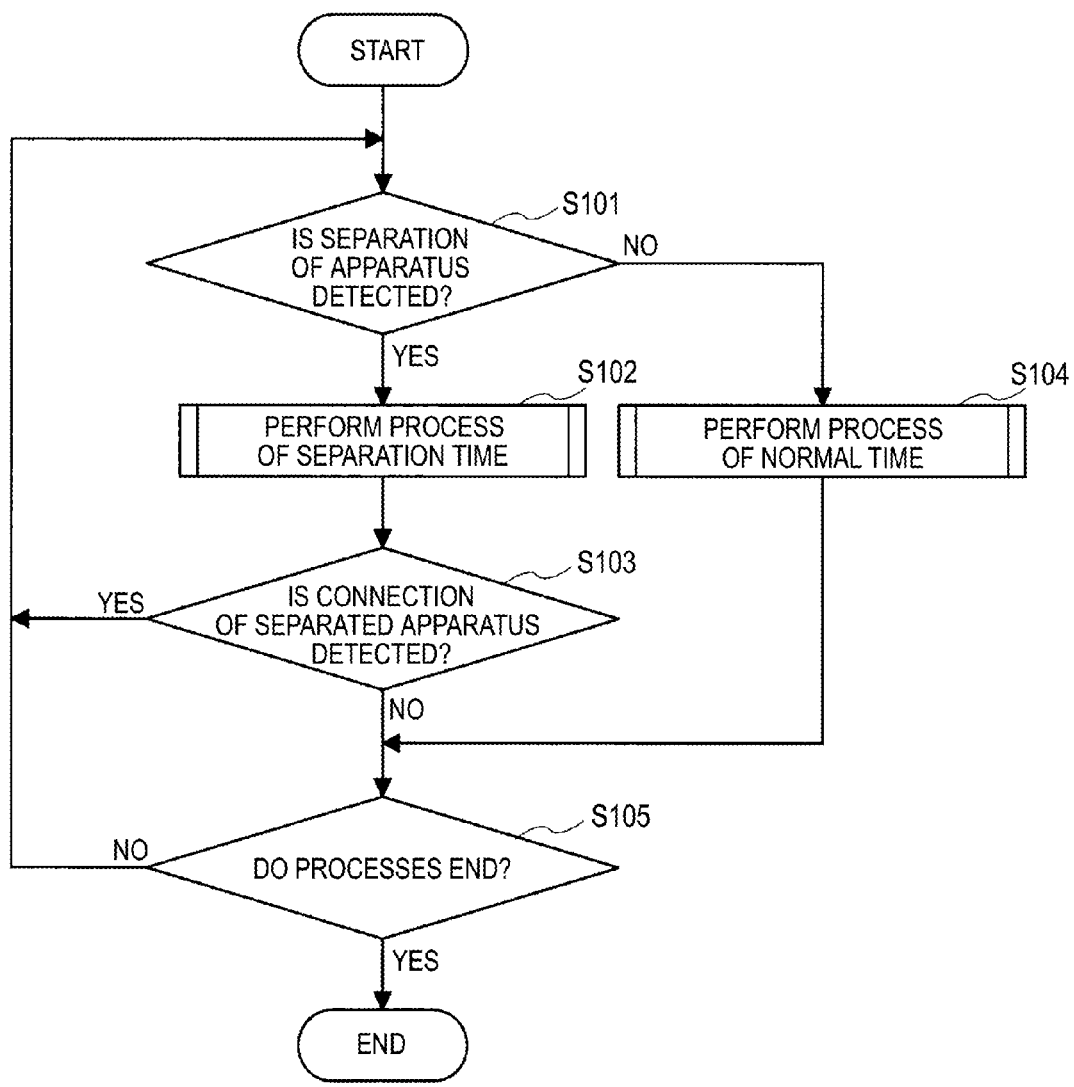
FIG. 7 is a diagram illustrating an example of a process of the system control apparatus according to the first embodiment.
Figure 8:
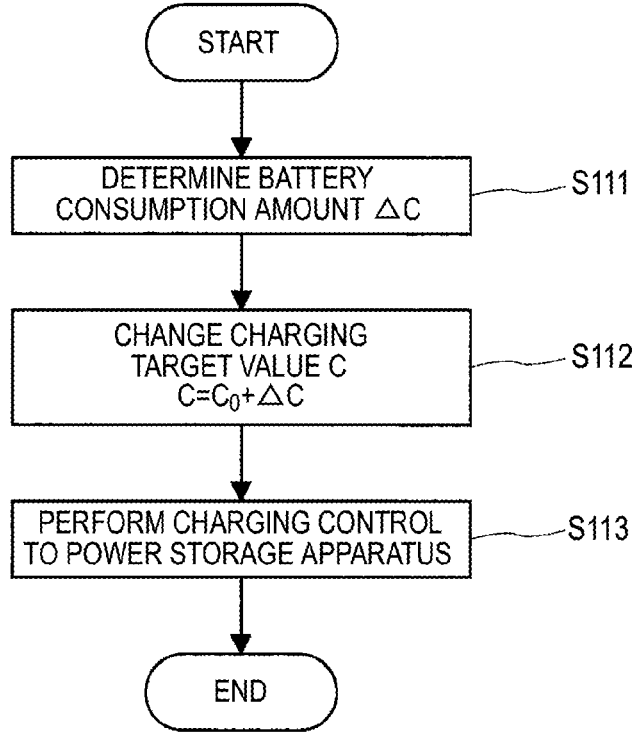
FIG. 8 is a diagram illustrating an example of a process of the system control apparatus according to the first embodiment.
Figure 9:
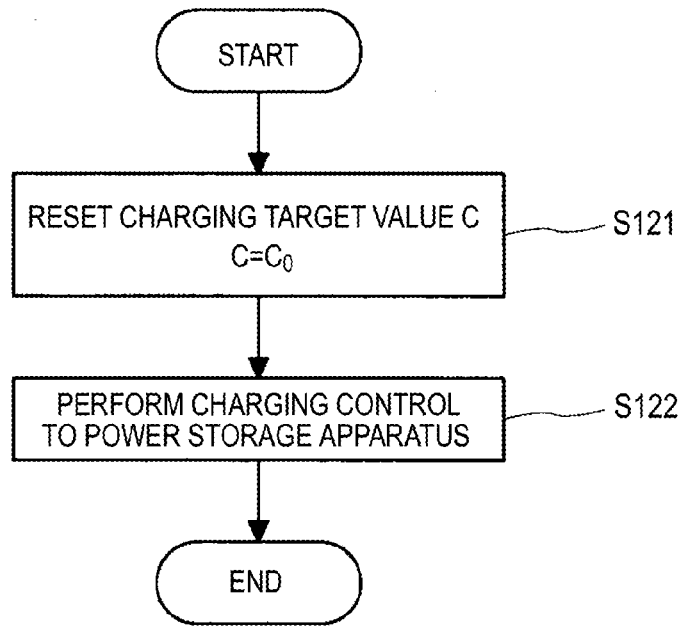
FIG. 9 is a diagram illustrating an example of a process of the system control apparatus according to the first embodiment.

Next, a process of the system control apparatus 100 according to this example embodiment will be described with reference to FIGS. 7 to 9. FIGS. 7 to 9 are diagrams illustrating the process of the system control apparatus 100 according to this embodiment.

Overall Processing Flow

First, description will be made with reference to FIG. 7. As shown in FIG. 7, the system control apparatus 100 determines whether the separation of the consumption apparatus 22 is detected (S101). When the separation of the consumption apparatus 22 is detected, the system control apparatus 100 allows the process to proceed to step S102. On the other hand, when the separation of the consumption apparatus 22 is not detected, the system control apparatus 100 allows the process to proceed to step S104. When the process proceeds to step S102, the system control apparatus 100 performs a process of the separation time described below (S102). Subsequently, the system control apparatus 100 determines whether the connection of the separated consumption apparatus 22 is detected (S103).

When the connection of the separated consumption apparatus 22 is detected, the system control apparatus 100 allows the process to proceed to step S101. On the other hand, when the connection of the separated consumption apparatus 22 is not detected, the system control apparatus 100 allows the process to proceed to step S105. When the process of step S101 proceeds to step S104, the system control apparatus 100 performs a process of the normal time described below (S104) and allows the process to proceed to step S105. When the process proceeds to step S105, the system control apparatus 100 determines whether a series of processes regarding the power storage control ends (S105). When the series of processes does not end, the system control apparatus 100 allows the process to proceed to step S101.

S102: Process of Separation Time

Next, description will be made with reference to FIG. 8. As shown in FIG. 8, the system control apparatus 100 starting the process of the separation time determines a battery consumption amount $\Delta C$ based on the apparatus information or the capacity information with reference to the consumption amount information (S111). Subsequently, the system control apparatus 100 changes a charging target value C based on Equation (1) below (S112). Here, $C_0$ is a predetermined reference value. This reference value is, for example, a value that is determined in advance based on the amount of power normally consumed by the household consumption apparatus 20 usually connected to the power system. Further, the charging target value C refers to a target value of the amount of power stored in the power storage apparatus 14. The system control apparatus 100 changing the charging target value C performs charging control based on the changed charging target value C (S113), and then ends the process of the separation time.

$$C = C_0 + \Delta C \quad (1)$$

S104: Process of Normal Time

Next, description will be made with reference to FIG. 9. As shown in FIG. 9, the system control apparatus 100 starting the process of the normal time resets the charging target value C to the predetermined reference value $C_0$ (step S121). Subsequently, the system control apparatus 100 performs charging control based on the reset charging target value C (S122), and then the process of the normal time ends.

The process of the system control apparatus 100 according to this embodiment has hitherto been described.

When the power storage control method according to the first embodiment of the present technology is applied, as described above, the power storage control is performed in consideration of the amount of power consumed by the separated consumption apparatus 22 even when the consumption apparatus 22 is separated. Accordingly, the efficient use of natural energy can be realized.

3: Second Embodiment (Amount of Consumption of Battery when Consumption Apparatus is Separated: Estimation from Use History)

Next, a second example embodiment of the present technology will be described.

3-1: Configuration of System Control Apparatus 100

Figures 10, 11:
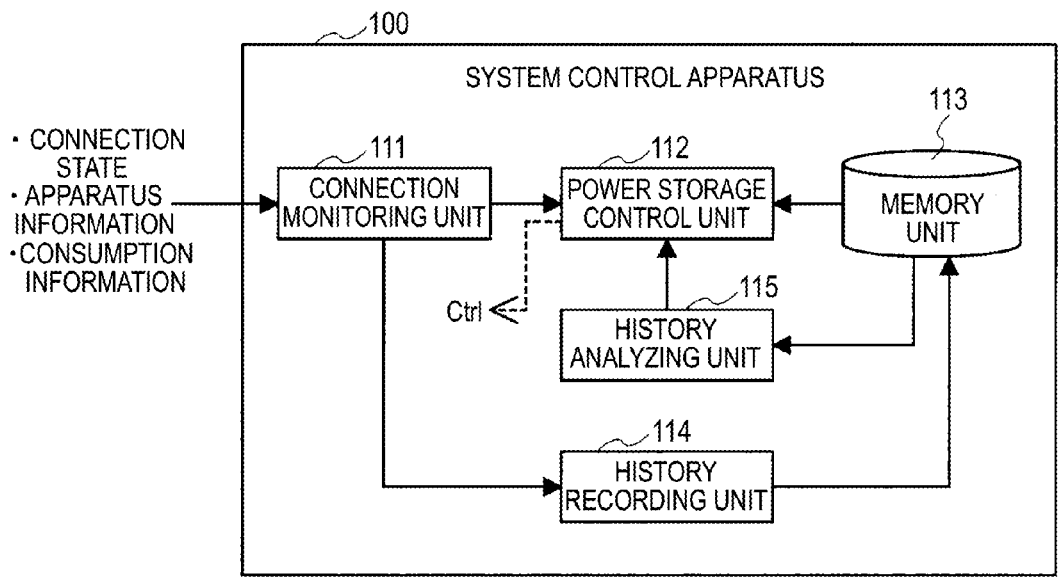
FIG. 10 is a diagram illustrating an example of the functional configuration of a system control apparatus according to a second embodiment of the present technology.
FIG. 11 is a diagram illustrating an example of the structure of use history according to the second embodiment.

First, the configuration of the system control apparatus 100 according to this example embodiment will be described with reference to FIG. 10. FIG. 10 is a diagram illustrating the configuration of the system control apparatus 100 according to this embodiment.

As shown in FIG. 10, the system control apparatus 100 includes a connection monitoring unit 111, a power storage control unit 112, a memory unit 113, a history recording unit 114, and a history analyzing unit 115.

The connection monitoring unit 111 monitors the connection state between the connector 21 and the consumption apparatus 22. For example, when the consumption apparatus 22 is separated from the connector 21, the connection monitoring unit 111 inputs the apparatus information used to identify the separated consumption apparatus 22, the capacity information regarding the battery capacity of the battery 222 mounted on the consumption apparatus 22, and information indicating the separation state into the power storage control unit 112. When the information indicating the separation state is input into the power storage control unit 112, the power storage control unit 112 acquires information (battery consumption amount) regarding the amount of power assumed to be consumed by the separated consumption apparatus 22 from the history analyzing unit 115. The power storage control unit 112 performs power storage control such that the extra amount of power excluding the acquired battery consumption amount is stored in the power storage apparatus 14.

The history analyzing unit 115 determines the amount (battery consumption amount) of power assumed to be consumed by the separated consumption apparatus 22 based on the use history shown in FIG. 11. The use history is acquired from the consumption apparatus 22 by the history recording unit 114 and is stored in the memory unit 113. First, the history analyzing unit 115 reads the use history shown in FIG. 11 from the memory unit 113 and extracts information corresponding to the separated consumption apparatus 22 or the battery capacity of the battery mounted on the consumption apparatus 22 from the read use history.

For example, when the separated consumption apparatus 22 is apparatus #1, the history analyzing unit 115 extracts the amounts ($C_1 \times 0.6$ and $C_1 \times 0.5$) of power consumed by apparatus #1 when apparatus #1 is separated once previously. In this case, the history analyzing unit 115 calculates the average $C_1 \times 0.55$ of the extracted battery consumption amounts and determines the calculated value as a battery consumption amount $\Delta C$ assumed to be consumed by separated apparatus #1 when the apparatus #1 is separated. The case in which the average is used has been exemplified. However, another statistical value such as a median value or a weighted average may be used. The determined battery consumption amount $\Delta C$ is used by the power storage control unit 112, as described above.

The configuration of the system control apparatus 100 according to this embodiment has hitherto been described.

3-2: Process of System Control Apparatus 100

Figure 12:
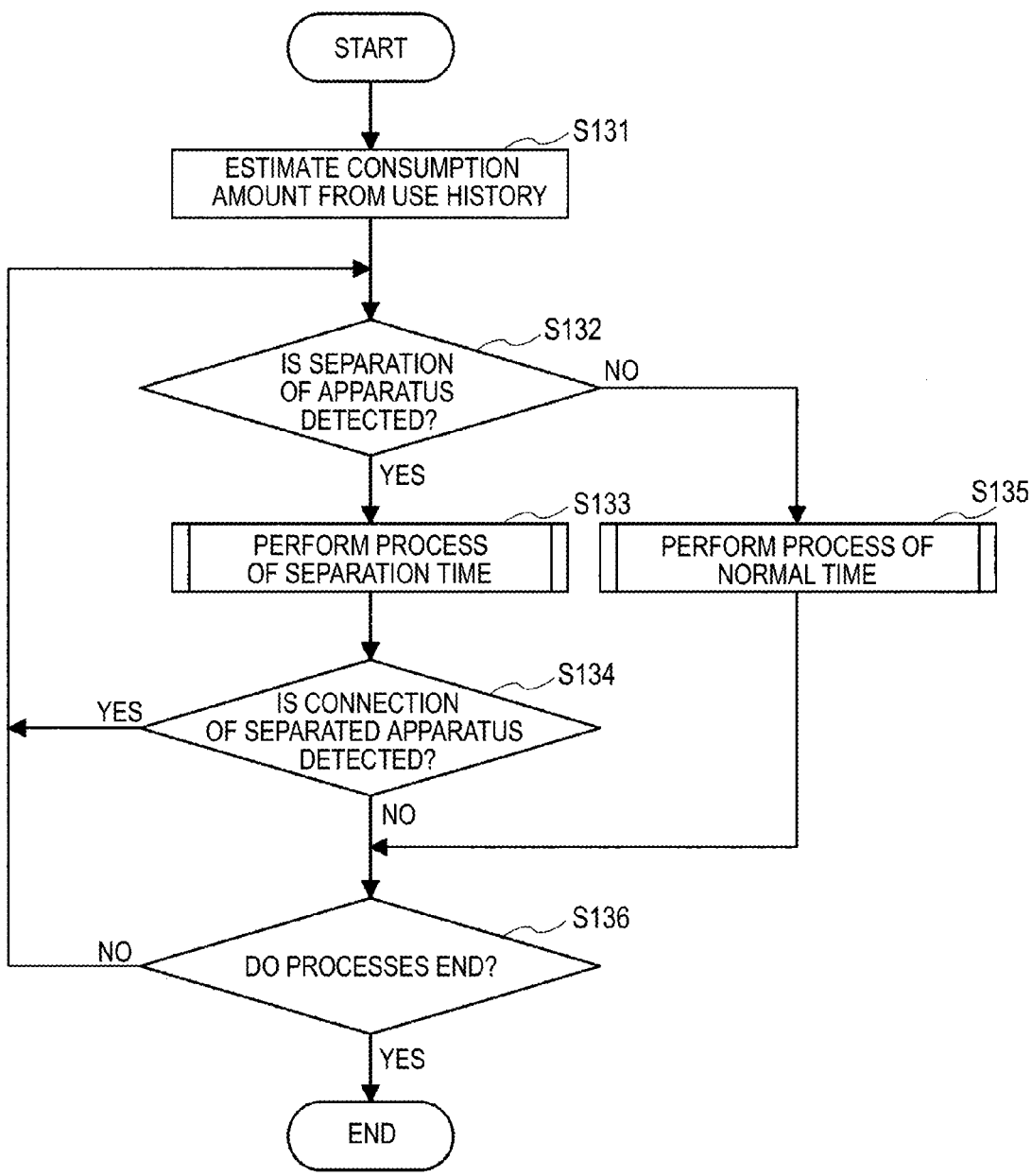
FIG. 12 is a diagram illustrating an example of a process of the system control apparatus according to the second embodiment.

Next, a process of the system control apparatus 100 according to this example embodiment will be described with reference to FIG. 12. FIG. 12 is a diagram illustrating the process of the system control apparatus 100 according to this embodiment.

As shown in FIG. 12, the system control apparatus 100 estimates the battery consumption amount based on the use history (S131). Subsequently, the system control apparatus 100 determines whether the separation of the consumption apparatus 22 is detected (S132). When the separation of the consumption apparatus 22 is detected, the system control apparatus 100 allows the process to proceed to step S133. On the other hand, when the separation of the consumption apparatus 22 is not detected, the system control apparatus 100 allows the process to proceed to step S135. When the process proceeds to step S133, the system control apparatus 100 performs the process of the separation time (see FIG. 8) (S133). Subsequently, the system control apparatus 100 determines whether the connection of the separated consumption apparatus 22 is detected (S134).

When the connection of the separated consumption apparatus 22 is detected, the system control apparatus 100 allows the process to proceed to step S132. On the other hand, when the connection of the separated consumption apparatus 22 is not detected, the system control apparatus 100 allows the process to proceed to step S136. When the process of step S132 proceeds to step S135, the system control apparatus 100 performs the process of the normal time (see FIG. 9) (S135) and allows the process to proceed to step S136. When the process proceeds to step S136, the system control apparatus 100 determines whether a series of processes regarding the power storage control ends (S136). When the series of processes does not end, the system control apparatus 100 allows the process to proceed to step S132.

The process of the system control apparatus 100 according to this embodiment has hitherto been described.

3-3: (Modified Example) Configuration for Distinguishing Users from Each Other

In the foregoing description, the method of determining the battery consumption amount $\Delta C$ based on the use history of the consumption apparatus 22 or the battery capacity of the battery mounted on the consumption apparatus 22 has been introduced. Hereinafter, a method of using the use history accumulated for each user when the battery consumption amount $\Delta C$ is determined will be introduced.

Figures 13, 14:
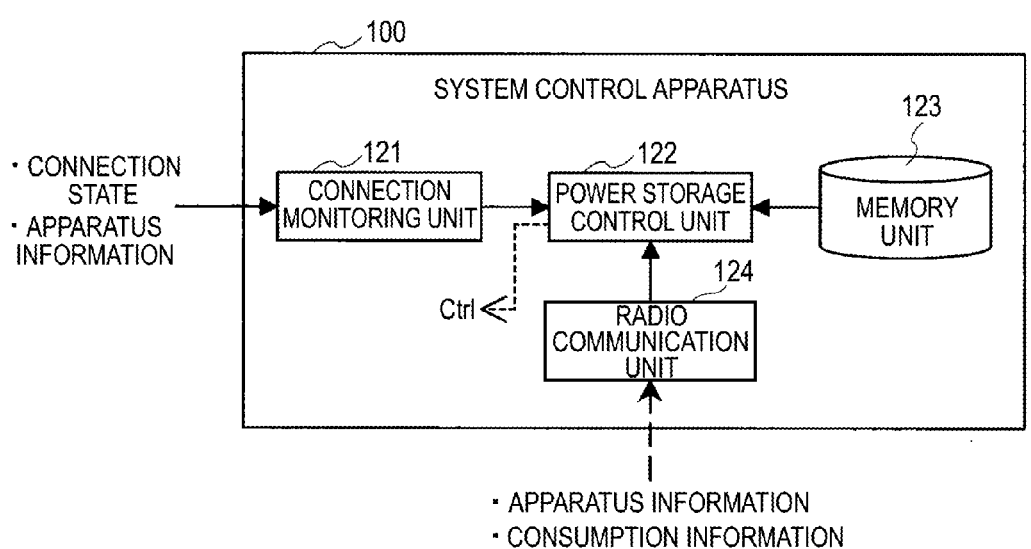
FIG. 13 is a diagram illustrating another example of the structure of use history according to the second embodiment.
FIG. 14 is a diagram illustrating an example of the functional configuration of a system control apparatus according to a third embodiment of the present technology.

A method of using the consumption apparatus 22 is different for each user. For example, when the consumption apparatus 22 is an electric vehicle, the large amount of power consumed in the one-time use is expected to be consumed for a user who has a tendency to repeat sudden starting or sudden stopping or a user who drives a car only along a mountain road. Therefore, to realize suitable power storage control, a method of determining the battery consumption amount $\Delta C$ for each user is preferably used. For example, a method of determining the battery consumption amount $\Delta C$ based on a use history shown in FIG. 13 is considered. Even in a scenario in which the same apparatus #1 is used, the battery consumption amount $\Delta C$ is equal to "$C_1 \times 0.55$" in a scenario in which user #1 uses the apparatus and the battery consumption amount $\Delta C$ is equal to "$C_1 \times 0.5$" in a scenario in which user #2 uses the apparatus, when the use history exemplified in FIG. 13 is used.

The modified example of the second embodiment has hitherto been described.

In the foregoing description, when the power storage control method according to the second embodiment of the present technology is applied, the power storage control is performed in consideration of the amount of power consumed by the separated consumption apparatus 22 even when the consumption apparatus 22 is separated. Therefore, the efficient use of natural energy can be realized.

4: Third Embodiment (Amount of Consumption of Battery when Consumption Apparatus is Separated: Reception Through Communication)

Next, a third example embodiment of the present technology will be described.

4-1: Configuration of System Control Apparatus 100

First, the configuration of the system control apparatus 100 according to this example embodiment will be described with reference to FIG. 14. FIG. 14 is a diagram illustrating the configuration of the system control apparatus 100 according to this embodiment.

As shown in FIG. 14, the system control apparatus 100 includes a connection monitoring unit 121, a power storage control unit 122, a memory unit 123, and a radio communication unit 124.

The connection monitoring unit 121 monitors the connection state between the connector 21 and the consumption apparatus 22. For example, when the consumption apparatus 22 is separated from the connector 21, the connection monitoring unit 121 inputs information (apparatus information) used to identify the separated consumption apparatus 22, information (capacity information) regarding the battery capacity of the battery 222 mounted on the consumption apparatus 22, and information indicating the separation state into the power storage control unit 122. Here, when the consumption apparatus 22 has a radio communication function (see FIG. 3), the radio communication unit 124 receives the apparatus information or the capacity information transmitted from the consumption apparatus 22. Further, the radio communication unit 124 receives information (hereinafter, referred to as consumption information) regarding the remaining level of the battery or the battery consumption amount transmitted periodically from the separated consumption apparatus 22.

The apparatus information, the capacity information, or the consumption information received by the radio communication unit 124 is input into the power storage control unit 122. The power storage control unit 122 into which such information is input determines the amount of power (battery consumption amount) assumed to be consumed by the separated consumption apparatus 22 based on the consumption information. For example, the power storage control unit 122 determines the battery consumption amount by subtracting the remaining level of the battery at the current time from the remaining level of the battery at the separation time. The power storage control unit 102 determining the battery consumption amount performs power storage control such that the extra amount of power excluding the determined battery consumption amount is stored in the power storage apparatus 14.

The configuration of the system control apparatus 100 according to this embodiment has hitherto been described.

4-2: Process of System Control Apparatus 100

Figure 15:
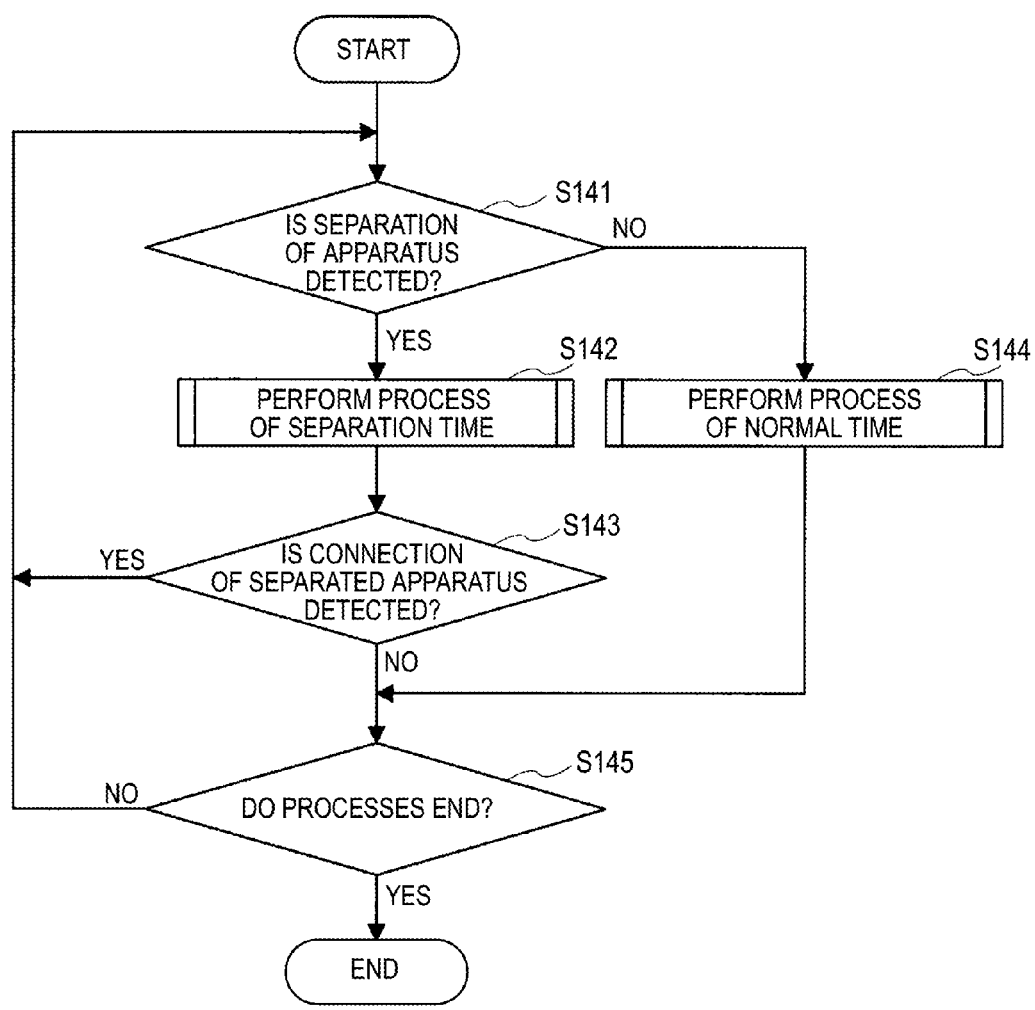
FIG. 15 is a diagram illustrating an example of a process of the system control apparatus according to the third embodiment.
Figure 16:
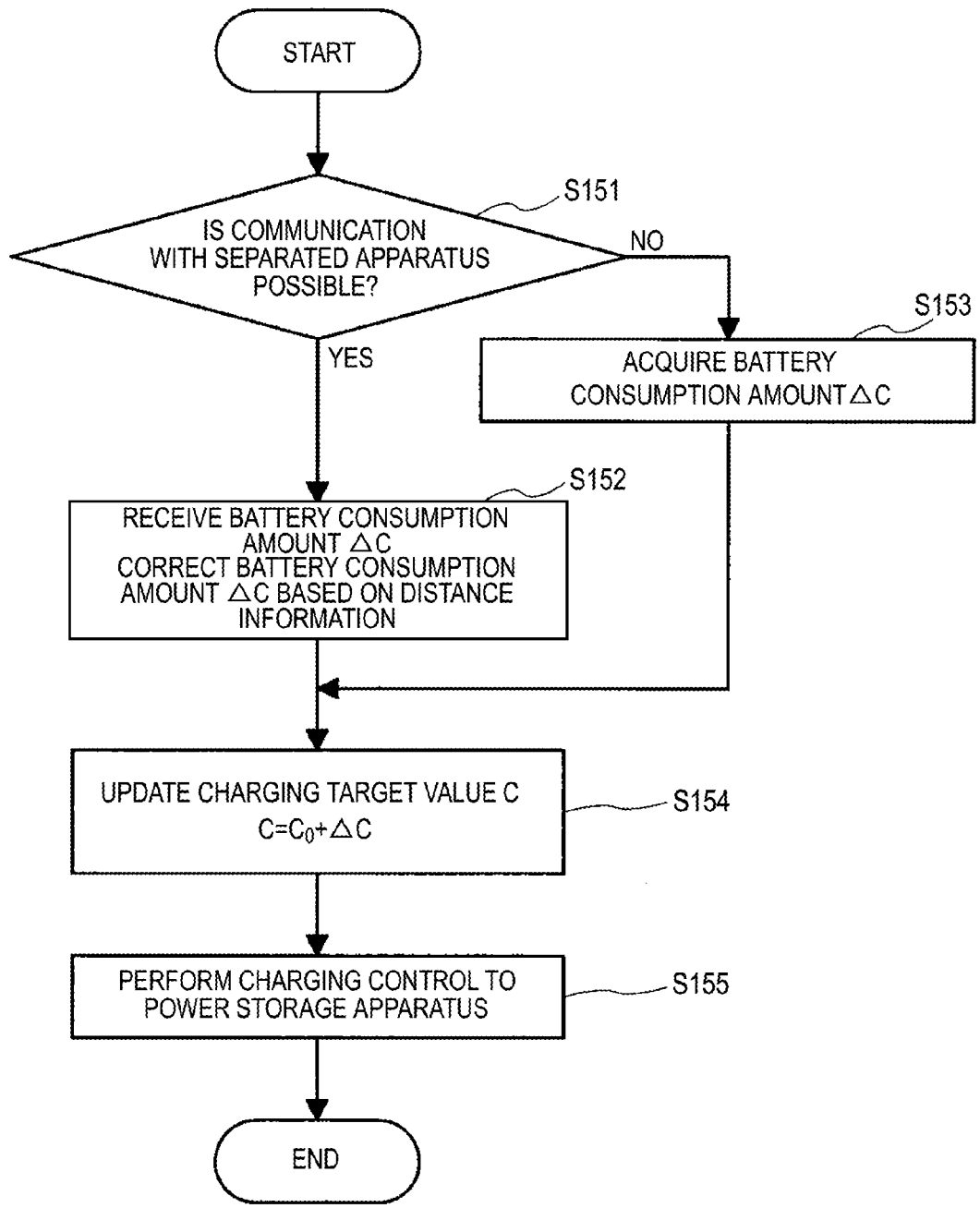
FIG. 16 is a diagram illustrating an example of a process of the system control apparatus according to the third embodiment.

Next, a process of the system control apparatus 100 according to this example embodiment will be described with reference to FIGS. 15 and 16. FIGS. 15 and 16 are diagrams illustrating the process of the system control apparatus 100 according to this embodiment.

Overall Processing Flow

First, description will be made with reference to FIG. 15. As shown in FIG. 15, the system control apparatus 100 determines whether the separation of the consumption apparatus 22 is detected (S141). When the separation of the consumption apparatus 22 is detected, the system control apparatus 100 allows the process to proceed to step S142. On the other hand, when the separation of the consumption apparatus 22 is not detected, the system control apparatus 100 allows the process to proceed to step S144. When the process proceeds to step S142, the system control apparatus 100 performs a process of the separation time described below (S142). Subsequently, the system control apparatus 100 determines whether the connection of the separated consumption apparatus 22 is detected (S143).

When the connection of the separated consumption apparatus 22 is detected, the system control apparatus 100 allows the process to proceed to step S141. On the other hand, when the connection of the separated consumption apparatus 22 is not detected, the system control apparatus 100 allows the process to proceed to step S145. When the process of step S141 proceeds to step S144, the system control apparatus 100 performs the process (see FIG. 9) of the normal time (S144) and allows the process to proceed to step S145. When the process proceeds to step S145, the system control apparatus 100 determines whether a series of processes regarding the power storage control ends (S145). When the series of processes does not end, the system control apparatus 100 allows the process to proceed to step S141.

S102: Process of Separation Time

Next, description will be made with reference to FIG. 16. As shown in FIG. 16, the system control apparatus 100 starting the process of the separation time determines whether to communicate with the separated consumption apparatus 22 (step S151). When the communication is possible, the system control apparatus 100 allows the process to proceed to step S152. On the other hand, when the communication may not be possible, the system control apparatus 100 allows the process to proceed to step S153. When the process proceeds to step S152, the system control apparatus 100 receives the battery consumption amount ΔC (or may receive the remaining level of the battery) from the consumption apparatus 22 through radio communication (S152). At this time, the system control apparatus 100 may acquire distance information (information regarding the distance between the location of the power system and the consumption apparatus 22) from the consumption apparatus 22 and may correct the battery consumption amount ΔC.

When the system control apparatus 100 receives the battery consumption amount ΔC, the process proceeds to step S154. Further, when the process proceeds to step S153, the system control apparatus 100 acquires the battery consumption amount ΔC based on the apparatus information or the capacity information with reference to the consumption amount information (S153). When the process proceeds to step S154, the system control apparatus 100 changes the charging target value C based on Equation (1) above (S154). Subsequently, the system control apparatus 100 performs charging control based on the changed charging target value C (S155), and then ends the process of the separation time.

The process of the system control apparatus 100 according to this embodiment has hitherto been described.

When the power storage control method according to the third embodiment of the present technology is applied, as described above, the power storage control is performed in consideration of the amount of power consumed by the separated consumption apparatus 22 when the consumption apparatus 22 is separated. Accordingly, the efficient use of natural energy can be realized.

5: Fourth Embodiment (Amount of Consumption of Battery when Consumption Apparatus is Separated: Estimation from Setting of Destination)

Next, a fourth example embodiment of the present technology will be described.

5-1: Configuration of System Control Apparatus 100

Figure 17:
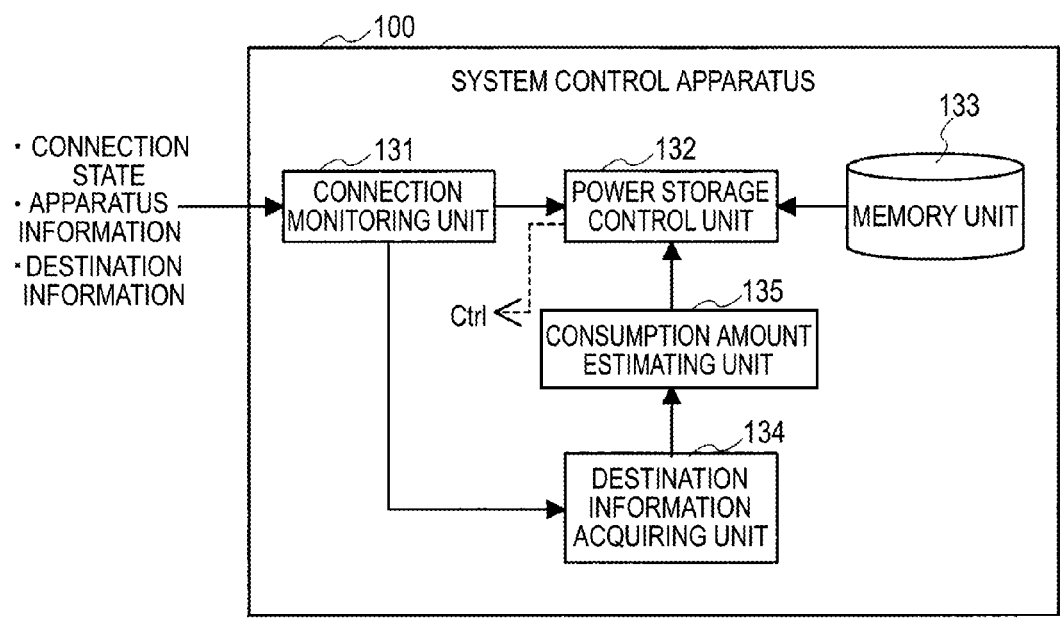
FIG. 17 is a diagram illustrating an example of the functional configuration of a system control apparatus according to a fourth embodiment of the present technology.
Figure 18:
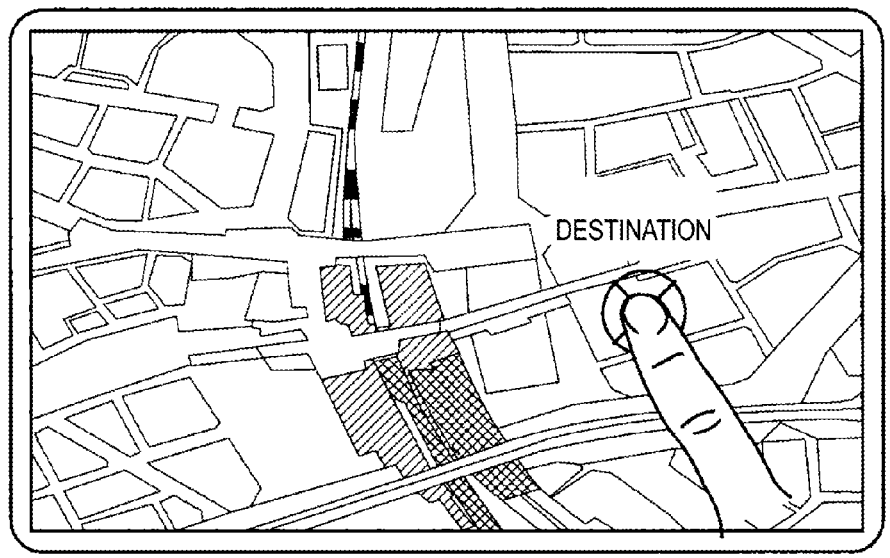
FIG. 18 is a diagram illustrating an acquisition example of destination information according to the fourth embodiment.

First, the configuration of the system control apparatus 100 according to this example embodiment will be described with reference to FIG. 17. FIG. 17 is a diagram illustrating the configuration of the system control apparatus 100 according to this embodiment.

As shown in FIG. 17, the system control apparatus 100 includes a connection monitoring unit 131, a power storage control unit 132, a memory unit 133, a destination information acquiring unit 134, and a consumption amount estimating unit 135.

The connection monitoring unit 131 monitors the connection state between the connector 21 and the consumption apparatus 22. For example, when the consumption apparatus 22 is separated from the connector 21, the connection monitoring unit 131 inputs the apparatus information used to identify the separated consumption apparatus 22, the capacity information regarding the battery capacity of the battery 222 mounted on the consumption apparatus 22, and information indicating the separation state into the power storage control unit 112. When the information indicating the separation state is input into the power storage control unit 132, the power storage control unit 132 acquires information (battery consumption amount) regarding the amount of power assumed to be consumed by the separated consumption apparatus 22 from the history analyzing unit 135. The power storage control unit 132 performs power storage control such that the extra amount of power excluding the acquired battery consumption amount is stored in the power storage apparatus 14.

The consumption amount estimating unit 135 estimates the battery consumption amount based on destination information acquired from the consumption apparatus 22 by the destination information acquiring unit 134. For example, when a user operates a navigation apparatus (see FIG. 18) mounted on the consumption apparatus 22 to input a destination, the destination information indicating the destination is transmitted from the navigation apparatus or the consumption apparatus 22 mounting the navigation apparatus. Then, the destination information acquiring unit 134 acquires the destination information indicating the destination from the consumption apparatus 22 through radio communication or power line communication. The destination information acquired by the destination information acquiring unit 134 is input into the consumption amount estimating unit 135.

When the destination information is input, the consumption amount estimating unit 135 calculates a distance between the current location to the destination and calculates the battery consumption amount ΔC of the separated consumption apparatus 22 by calculating the amount of power to be consumed by the consumption apparatus 22 in accordance with the distance. Here, information regarding the amount of power to be consumed by the consumption apparatus 22 based on a unit distance is assumed to be retained by the consumption amount estimating unit 135. The calculated battery consumption amount ΔC is used by the power storage control unit 132, as described above.

The configuration of the system control apparatus 100 according to this embodiment has hitherto been described.

5-2: Process of System Control Apparatus 100

Figure 19:
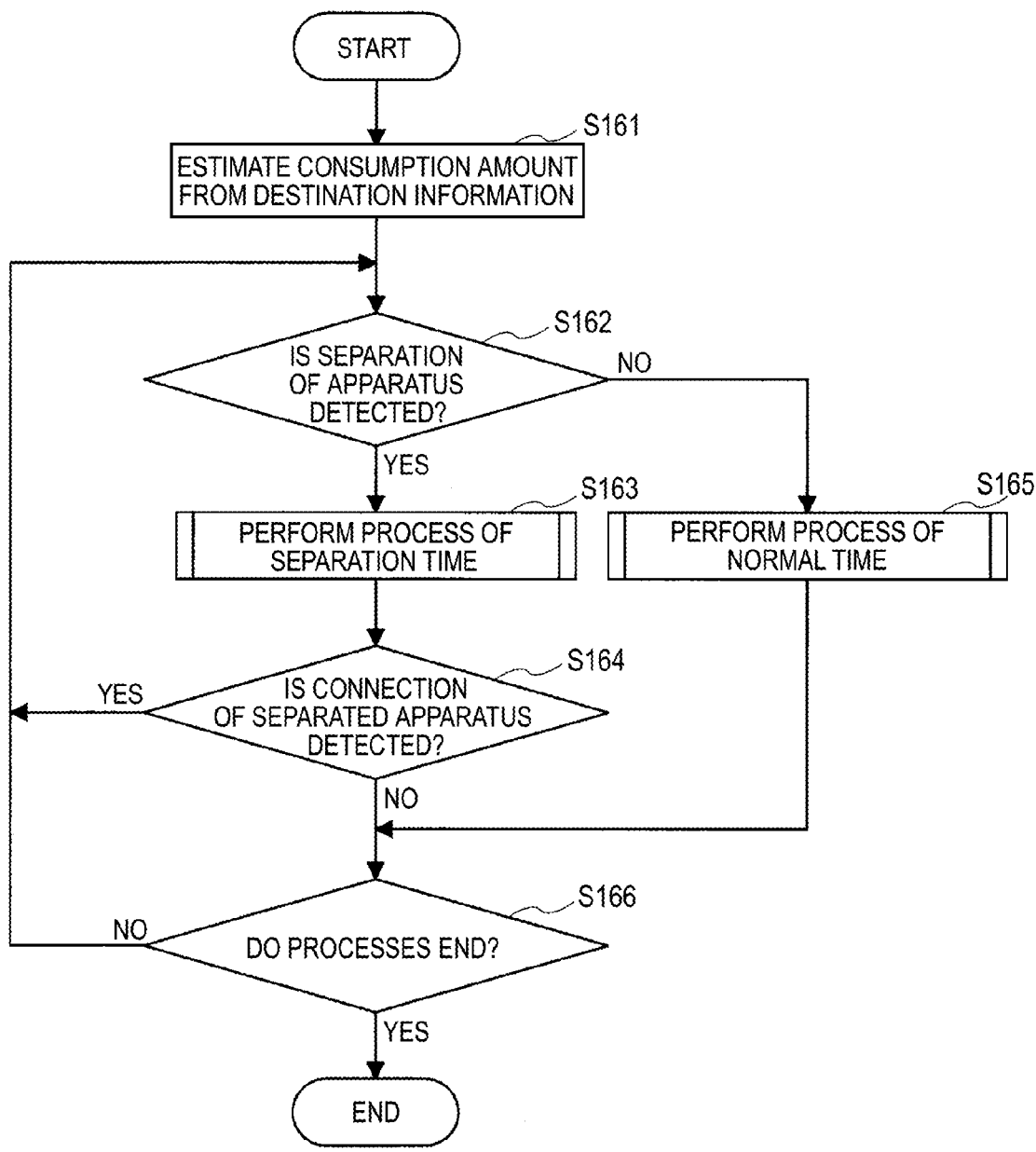
FIG. 19 is a diagram illustrating an example of a process of the system control apparatus according to the fourth embodiment.

Next, a process of the system control apparatus 100 according to this example embodiment will be described with reference to FIG. 19. FIG. 19 is a diagram illustrating the process of the system control apparatus 100 according to this embodiment.

As shown in FIG. 19, the system control apparatus 100 estimates the battery consumption amount based on the destination information (S161). Subsequently, the system control apparatus 100 determines whether the separation of the consumption apparatus 22 is detected (S162). When the separation of the consumption apparatus 22 is detected, the system control apparatus 100 allows the process to proceed to step S163. On the other hand, when the separation of the consumption apparatus 22 is not detected, the system control apparatus 100 allows the process to proceed to step S165. When the process proceeds to step S163, the system control apparatus 100 performs the process of the separation time (see FIG. 8) (S163). Subsequently, the system control apparatus 100 determines whether the connection of the separated consumption apparatus 22 is detected (S164).

When the connection of the separated consumption apparatus 22 is detected, the system control apparatus 100 allows the process to proceed to step S162. On the other hand, when the connection of the separated consumption apparatus 22 is not detected, the system control apparatus 100 allows the process to proceed to step S166. When the process of step S162 proceeds to step S165, the system control apparatus 100 performs the process of the normal time (see FIG. 9) (S165) and allows the process to proceed to step S166. When the process proceeds to step S166, the system control apparatus 100 determines whether a series of processes regarding the power storage control ends (S166). When the series of processes does not end, the system control apparatus 100 allows the process to proceed to step S162.

The process of the system control apparatus 100 according to this embodiment has hitherto been described.

In the foregoing description, when the power storage control method according to the fourth example embodiment of the present technology is applied, the power storage control is performed in consideration of the amount of power consumed by the separated consumption apparatus 22 even when the consumption apparatus 22 is separated. Therefore, the efficient use of natural energy can be realized.

6: Example of Hardware Configuration of System Control Apparatus 100

The functions of the constituent elements of the above-described system control apparatus 100 can be realized by, for example, a hardware configuration shown in FIG. 20. That is, the functions of the units are realized by controlling the hardware shown in FIG. 20 by a computer program. Further, the hardware has any form and examples of the hardware include a personal computer, a cellular phone, a PHS, a portable information terminal such as a PDA, a game console, and various information home appliances. PHS is an abbreviation for personal handy-phone system. PDA is an abbreviation for personal digital assistant.

As shown in FIG. 20, the hardware includes a CPU 902, a ROM 904, a RAM 906, a host bus 908, and a bridge 910. The hardware further includes an external bus 912, an interface 914, an input unit 916, an output unit 918, a memory unit 920, a drive 922, a connection port 924, and a communication unit 926. CPU is an abbreviation for central processing unit. ROM is an abbreviation for read-only memory. RAM is an abbreviation for random access memory.

For example, the CPU 902 functions as an arithmetic processing device or a control device. The CPU 902 controls all or some of the processes of the constituent units based on various programs recorded in the ROM 904, the RAM 906, the memory unit 920, or a removable recording medium 928. The ROM 904 is a unit that stores data or the like used for a program read by the CPU 902 or calculation. For example, the RAM 906 temporarily or permanently stores the program read by the CPU 902 or various parameters appropriately changed when the program is executed.

The constituent units are connected to each other via the host bus 908 capable of transmitting data at high speed. On the other hand, the host bus 908 is connected to the external bus 912, which transmits data at relatively low speed, via the bridge 910. For example, a mouse, a keyboard, a touch panel, a button, a switch, or a lever is used as the input unit 916. Further, a remote controller (hereinafter, referred to as a remote control) capable of transmitting a control signal through an infrared ray or other radio waves may be used as the input unit 916 in some cases.

For example, a display apparatus such as a CRT, an LCD, a PDP, or an ELD, an audio output apparatus such as a speaker or a headphone, a printer, a cellular phone, or facsimile, which can notify a user of acquired information in a visual or auditory manner, can be used as the output unit 918. Here, CRT is an abbreviation for cathode ray tube. LCD is an abbreviation for liquid crystal display. PDP is an abbreviation for plasma display panel. ELD is an abbreviation for electro-luminescence display.

The memory unit 920 is a device that stores various kinds of data. For example, a magnetic memory device such as an HDD, a semiconductor memory device, an optical memory device, or a magneto-optical memory device is used as the memory unit 920. Here, HDD is an abbreviation for hard disk drive.

The drive 922 is a device that reads information recorded in the removable recording medium 928, such as a magnetic disk, an optical disc, a magneto-optical disc, or a semiconductor memory or writes information on the removable recording medium 928. The removable recording medium 928 is, for example, a DVD medium, a Blu-ray medium, an HD DVD medium, or one of various semiconductor memory media. Of course, the removable recording medium 928 may be an IC card or an electronic apparatus mounting a non-contact type IC chip. Here, IC is an abbreviation for integrated circuit.

The connection port 924 is a port that connects external connection equipment 930 such as a USB port, an IEEE 1394 port, a SCSI, an RS-232 C port, or an optical audio terminal. The external connection equipment 930 is, for example, a printer, a portable music player, a digital camera, a digital video camera, or an IC recorder. Here, USB is an abbreviation for universal serial bus. SCSI is an abbreviation for small computer system interface.

The communication unit 926 is a communication device which is connected to a network 932 and is, for example, a wired or wireless LAN, the Bluetooth (registered trademark), a communication card for WUSB, a router for optical communication, a router for ADSL, or a modem for various kinds of communication. The network 932 connected to the communication unit 926 is configured by networks connected in a wired or wireless manner and is, for example, the Internet, a household LAN, infrared communication, visible light communication, broadcast, or satellite communication, or the like. Here, LAN is an abbreviation for local area network. WUSB is an abbreviation for wireless USB. ADSL is an abbreviation for asymmetric digital subscriber line.

7: Brief

Finally, the technical spirit according to the example embodiments will be summarized in brief. The summarized technical spirit can be realized using various kinds of information processing apparatuses such as PCs, game consoles, information terminals, information home appliances, or car navigation systems.

7-1: Combinations of Embodiments

The above-described first to fourth example embodiments of the present technology can be combined for use. For example, when the battery consumption amount is determined, the use history is used in a case where the use history can be used, the battery consumption amount is acquired by radio communication in a case where radio communication can be used, the battery consumption amount is estimated from the destination information in a case where the destination information can be acquired, and a method of using a predetermined battery consumption amount is used in a case where any method may not be used. Further, methods of combining the above-described first to fourth embodiments can be determined arbitrarily.

7-2: Expression of Technical Spirit

An apparatus (power storage control apparatus) and a method embodying the technical spirit according to the above-described first to fourth embodiments can be configured as follows. For example, a power storage control apparatus described below in (1) can adjust the amount of power to be stored in a storage apparatus in consideration of the power consumed by a separated consumption apparatus when the consumption apparatus is separated. Therefore, the power corresponding to power used to charge a battery of the consumption apparatus can be stored in advance in the power storage apparatus. In particular, since the power generated from natural energy can be stored in advance as the power used to charge the consumption apparatus, the efficient use of natural energy is realized.

In one example embodiment, a power storage control apparatus comprises a power storage control unit configured to (a) determine a connection state of a consumption apparatus with a power supply, (b) determine an expected amount of power usage by the consumption apparatus in a connected state, and (c) adjusting a target value of power storage for a power storage apparatus based on a change in connection state and the expected amount of power usage by the consumption apparatus. In an example embodiment, the connection state is one of (i) a wirelessly connected state, (ii) a directly connected state, and (iii) a not connected state. In an example embodiment, the consumption apparatus is configured to wirelessly connect to the power supply to perform a wireless power transfer. In an example embodiment, a wireless power supply connection is provided using inductive coupling. In an example embodiment, a wireless power supply connection is provided using resonant coupling. In an example embodiment, the consumption apparatus is configured to plug into to the power supply to perform a wired power transfer over a direct electrical connection. In an example embodiment, the expected amount of power usage is determined based on stored consumption amount information. In an example embodiment, the target value is adjusted when the consumption apparatus is separated from the power supply. In an example embodiment, the target value is adjusted based on schedule information of the consumption apparatus. In an example embodiment, the target value of power storage is adjusted by providing a control signal to the power storage apparatus. In an example embodiment, the power storage control apparatus further comprises a connection monitoring unit for monitoring a connection state of the consumption apparatus with the power supply, wherein the power storage control unit receives data, from the connection monitoring unit, including at least a connection state of the consumption apparatus. In an example embodiment, the power storage control apparatus further comprises a memory unit storing consumption amount information for the consumption apparatus. In an example embodiment, the expected amount of power usage is determined by using a value obtained based on a battery capacity of the consumption apparatus and a predetermined ratio. In an example embodiment, the target value is set based on a sum of a reference value indicative of the amount of power normally consumed by at least one household consumption apparatus and expected amount of power usage by the consumption apparatus. In an example embodiment, the target value is reset to a reference value indicative of the amount of power normally consumed by at least one household consumption apparatus when the consumption apparatus is in a connected state. In an example embodiment, the connection monitoring unit includes a history recording unit and a history analyzing unit, and the expected amount of power usage is determined based on a history of use of the consumption apparatus. In an example embodiment, the expected amount of power usage is determined using at least one of an average, a median, and a weighted average. In an example embodiment, the expected amount of power usage is determined based on a history of use of a specific user. In an example embodiment, the connection monitoring unit provides consumption apparatus information including identification information. In an example embodiment, the connection monitoring unit provides consumption amount information including at least one of a battery capacity, a battery consumption amount, and a remaining level of battery power. In an example embodiment, the power storage control apparatus further comprises a destination information acquiring unit, and a consumption amount estimating unit that estimates a battery consumption amount based on destination information acquired by the destination information acquiring unit. In an example embodiment, the destination information acquiring unit receives a transmission from a navigation apparatus mounted in the consumption apparatus. In an example embodiment, the destination information acquiring unit receives a transmission via at least one of a radio communication and power line communication. In an example embodiment, the consumption amount estimating unit calculates a distance between a location of the consumption apparatus and the power supply and calculates a battery consumption amount of the consumption apparatus by calculating the expected amount of power to be consumed by the consumption apparatus based on the distance. In an example embodiment, the power supply is configured to connect to a plurality of consumption apparatuses and the power storage control unit is configured to determine an expected amount of power usage for each of the plurality of consumption apparatuses. In an example embodiment, stored consumption amount information includes information for a working day and for a non-working day. In an example embodiment, the power storage apparatus is configured to receive power from power generation equipment that generates power from natural energy, the power generation equipment including at least one of a photovoltaic panel, wind power generation equipment, hydraulic power generation equipment, geothermal power generation equipment, and biomass power generation equipment. In an example embodiment, the power storage apparatus is configured to sell power stored in the power storage apparatus to a power company. In an example embodiment, the consumption apparatus includes an information supply unit configured to transmit information from the consumption apparatus to a power storage control unit when the consumption apparatus is connected to the power supply, and wherein the transmitted information includes at least one of apparatus information and capacity information. In an example embodiment, the capacity information includes at least one of battery capacity and a remaining level of the battery power. In an example embodiment, the apparatus information includes at least one of identification information specifying the battery and identification information specifying the consumption apparatus. In an example embodiment, the consumption apparatus includes an information supply unit configured to transmit information from the consumption apparatus to a power storage control unit when the consumption apparatus is connected to the power supply, and wherein the information supply unit calculates an amount of power consumed by the consumption apparatus prior to connecting to the power supply. In an example embodiment, the consumption apparatus includes an information supply unit configured to transmit information from the consumption apparatus to a power storage control unit when the consumption apparatus is connected to the power supply, and wherein the information supply unit transmits user identification information for the consumption apparatus. In an example embodiment, the consumption apparatus includes an information supply unit configured to transmit information from the consumption apparatus to a power storage control unit when the consumption apparatus is connected to the power supply, and wherein the information supply unit transmits the information by power line communication. In an example embodiment, the consumption apparatus is at least one of an electric vehicle, an electric scooter, an electric bicycle, a cellular phone, a portable information terminal, and a portable battery. In an example embodiment, the consumption apparatus includes a driving unit, a battery, a connection unit, and an information supply unit. In an example embodiment, the power storage control apparatus further comprises a radio communication unit that receives distance information indicative of a distance between the location of the consumption apparatus and the power supply. In an example embodiment, the power storage control apparatus further comprises a radio communication unit that receives distance information indicative of a distance between the current location of the consumption apparatus and a destination input into a navigation apparatus that is mounted in the consumption apparatus. In an example embodiment, the power storage control apparatus further comprises a radio communication unit that receives distance information indicative of an estimated distance based on a destination input into a navigation apparatus that is mounted in the consumption apparatus. In an example embodiment, a navigation apparatus is mounted in the consumption apparatus and provides destination information for transmission to the power storage control unit.

In another example embodiment, a power storage control method comprises determining a connection state of a consumption apparatus with a power supply, determining an expected amount of power usage by the consumption apparatus in a connected state, and adjusting a target value of power storage for a power storage apparatus based on a change in connection state and the expected amount of power usage by the consumption apparatus. In an example embodiment, the connection state is one of (i) a wirelessly connected state, (ii) a directly connected state, and (iii) a not connected state. In an example embodiment, the consumption apparatus is configured to wirelessly connect to the power supply to perform a wireless power transfer. In an example embodiment, a wireless power supply connection is provided using inductive coupling. In an example embodiment, a wireless power supply connection is provided using resonant coupling. In an example embodiment, the consumption apparatus is configured to plug into to the power supply to perform a wired power transfer over a direct electrical connection. In an example embodiment, the expected amount of power usage is determined based on stored consumption amount information. In an example embodiment, the target value is adjusted when the consumption apparatus is separated from the power supply. In an example embodiment, the target value is adjusted based on schedule information of the consumption apparatus. In an example embodiment, the target value of power storage is adjusted by providing a control signal to the power storage apparatus. In an example embodiment, the power storage control method further comprises monitoring a connection state of the consumption apparatus with the power supply, and receiving data including at least a connection state of the consumption apparatus. In an example embodiment, the power storage control method further comprises storing consumption amount information for the consumption apparatus. In an example embodiment, the expected amount of power usage is determined by using a value obtained based on a battery capacity of the consumption apparatus and a predetermined ratio. In an example embodiment, the target value is set based on a sum of a reference value indicative of the amount of power normally consumed by at least one household consumption apparatus and expected amount of power usage by the consumption apparatus. In an example embodiment, the target value is reset to a reference value indicative of the amount of power normally consumed by at least one household consumption apparatus when the consumption apparatus is in a connected state. In an example embodiment, the connection monitoring unit includes a history recording unit and a history analyzing unit, and the expected amount of power usage is determined based on a history of use of the consumption apparatus. In an example embodiment, the expected amount of power usage is determined using at least one of an average, a median, and a weighted average. In an example embodiment, the expected amount of power usage is determined based on a history of use of a specific user. In an example embodiment, the connection monitoring unit provides consumption apparatus information including identification information. In an example embodiment, the connection monitoring unit provides consumption amount information including at least one of a battery capacity, a battery consumption amount, and a remaining level of battery power. In an example embodiment, the power storage control method further comprises acquiring destination information and estimating a battery consumption amount based on the destination information. In an example embodiment, the destination information acquiring unit receives a transmission from a navigation apparatus mounted in the consumption apparatus. In an example embodiment, the destination information acquiring unit receives a transmission via at least one of a radio communication and power line communication. In an example embodiment, a distance between a location of the consumption apparatus and the power supply is calculated and a battery consumption amount of the consumption apparatus is calculated by calculating the expected amount of power to be consumed by the consumption apparatus based on the distance. In an example embodiment, the power supply is configured to connect to a plurality of consumption apparatuses and an expected amount of power usage for each of the plurality of consumption apparatuses is determined. In an example embodiment, stored consumption amount information includes information for a working day and for a non-working day. In an example embodiment, the power storage apparatus is configured to receive power from power generation equipment that generates power from natural energy, the power generation equipment including at least one of a photovoltaic panel, wind power generation equipment, hydraulic power generation equipment, geothermal power generation equipment, and biomass power generation equipment. In an example embodiment, the power storage apparatus is configured to sell power stored in the power storage apparatus to a power company. In an example embodiment, the consumption apparatus includes an information supply unit configured to transmit information from the consumption apparatus to a power storage control unit when the consumption apparatus is connected to the power supply, and wherein the transmitted information includes at least one of apparatus information and capacity information. In an example embodiment, the capacity information includes at least one of battery capacity and a remaining level of the battery power. In an example embodiment, the apparatus information includes at least one of identification information specifying the battery and identification information specifying the consumption apparatus. In an example embodiment, the consumption apparatus includes an information supply unit configured to transmit information from the consumption apparatus to a power storage control unit when the consumption apparatus is connected to the power supply, and wherein the information supply unit calculates an amount of power consumed by the consumption apparatus prior to connecting to the power supply. In an example embodiment, the consumption apparatus includes an information supply unit configured to transmit information from the consumption apparatus to a power storage control unit when the consumption apparatus is connected to the power supply, and wherein the information supply unit transmits user identification information for the consumption apparatus. In an example embodiment, the consumption apparatus includes an information supply unit configured to transmit information from the consumption apparatus to a power storage control unit when the consumption apparatus is connected to the power supply, and wherein the information supply unit transmits the information by power line communication. In an example embodiment, the consumption apparatus is at least one of an electric vehicle, an electric scooter, an electric bicycle, a cellular phone, a portable information terminal, and a portable battery. In an example embodiment, the consumption apparatus includes a driving unit, a battery, a connection unit, and an information supply unit. In an example embodiment, the power storage control method further comprises receiving distance information indicative of a distance between the location of the consumption apparatus and the power supply. In an example embodiment, the power storage control method further comprises receiving distance information indicative of a distance between the current location of the consumption apparatus and a destination input into a navigation apparatus that is mounted in the consumption apparatus. In an example embodiment, the power storage control method further comprises receiving distance information indicative of an estimated distance based on a destination input into a navigation apparatus that is mounted in the consumption apparatus. In an example embodiment, a navigation apparatus is mounted in the consumption apparatus and provides destination information for transmission to the power storage control unit.

In another example embodiment, a consumption apparatus comprises a connection unit configured to connect to a power supply; and an information supply unit configured to transmit information from the consumption apparatus to a power storage control unit when the consumption apparatus is connected to the power supply, wherein the transmitted information is configured to allow the power storage control unit to (a) determine an expected amount of power usage by the consumption apparatus, and (b) adjust a target value of power storage for a power storage apparatus based on the expected amount of power usage by the consumption apparatus. In an example embodiment, a connection state of the connection unit with a power supply is one of (i) a wirelessly connected state, (ii) a directly connected state, and (iii) a not connected state. In an example embodiment, the connection unit is configured to wirelessly connect to the power supply to perform a wireless power transfer. In an example embodiment, a wireless power supply connection is provided using inductive coupling. In an example embodiment, a wireless power supply connection is provided using resonant coupling. In an example embodiment, the connection unit is configured to plug into to the power supply to perform a wired power transfer over a direct electrical connection. In an example embodiment, the expected amount of power usage is determined based on stored consumption amount information. In an example embodiment, the target value is adjusted when the consumption apparatus is separated from the power supply. In an example embodiment, the target value is adjusted based on schedule information of the consumption apparatus. In an example embodiment, the target value of power storage is adjusted by providing a control signal to the power storage apparatus. In an example embodiment, a connection state of the connection unit with the power supply is monitored by a connection monitoring unit, wherein the power storage control unit receives data, from the connection monitoring unit, including at least a connection state of the connection unit. In an example embodiment, a memory unit stores consumption amount information for the consumption apparatus. In an example embodiment, the expected amount of power usage is determined by using a value obtained based on a battery capacity of the consumption apparatus and a predetermined ratio. In an example embodiment, the target value is set based on a sum of a reference value indicative of the amount of power normally consumed by at least one household consumption apparatus and expected amount of power usage by the consumption apparatus. In an example embodiment, the target value is reset to a reference value indicative of the amount of power normally consumed by at least one household consumption apparatus when the consumption apparatus is in a connected state. In an example embodiment, a connection monitoring unit includes a history recording unit and a history analyzing unit, and the expected amount of power usage is determined based on a history of use of the consumption apparatus. In an example embodiment, the expected amount of power usage is determined using at least one of an average, a median, and a weighted average. In an example embodiment, the expected amount of power usage is determined based on a history of use of a specific user. In an example embodiment, a connection monitoring unit provides consumption apparatus information including identification information. In an example embodiment, a connection monitoring unit provides consumption amount information including at least one of a battery capacity, a battery consumption amount, and a remaining level of battery power. In an example embodiment, the information supply unit provides destination information to a destination information acquiring unit, and a consumption amount estimating unit estimates a battery consumption amount based on destination information acquired by the destination information acquiring unit. In an example embodiment, the destination information acquiring unit receives a transmission from a navigation apparatus mounted in the consumption apparatus. In an example embodiment, the destination information acquiring unit receives a transmission via at least one of a radio communication and power line communication. In an example embodiment, the consumption amount estimating unit calculates a distance between a location of the consumption apparatus and the power supply and calculates a battery consumption amount of the consumption apparatus by calculating the expected amount of power to be consumed by the consumption apparatus based on the distance. In an example embodiment, the power supply is configured to connect to a plurality of consumption apparatuses and the power storage control unit is configured to determine an expected amount of power usage for each of the plurality of consumption apparatuses. In an example embodiment, stored consumption amount information includes information for a working day and for a non-working day. In an example embodiment, the power storage apparatus is configured to receive power from power generation equipment that generates power from natural energy, the power generation equipment including at least one of a photovoltaic panel, wind power generation equipment, hydraulic power generation equipment, geothermal power generation equipment, and biomass power generation equipment. In an example embodiment, the power storage apparatus is configured to sell power stored in the power storage apparatus to a power company. In an example embodiment, the transmitted information includes at least one of apparatus information and capacity information. In an example embodiment, the capacity information includes at least one of battery capacity and a remaining level of the battery power. In an example embodiment, the apparatus information includes at least one of identification information specifying the battery and identification information specifying the consumption apparatus. In an example embodiment, the information supply unit calculates an amount of power consumed by the consumption apparatus prior to connecting to the power supply. In an example embodiment, the information supply unit transmits user identification information for the consumption apparatus. In an example embodiment, the information supply unit transmits the information by power line communication. In an example embodiment, the consumption apparatus is at least one of an electric vehicle, an electric scooter, an electric bicycle, a cellular phone, a portable information terminal, and a portable battery. In an example embodiment, the consumption apparatus includes a driving unit, a battery, a connection unit, and an information supply unit. In an example embodiment, the consumption apparatus further comprises a radio communication unit that transmits distance information indicative of a distance between the location of the consumption apparatus and the power supply. In an example embodiment, the consumption apparatus further comprises a radio communication unit that transmits distance information indicative of a distance between the current location of the consumption apparatus and a destination input into a navigation apparatus that is mounted in the consumption apparatus. In an example embodiment, the consumption apparatus further comprises a radio communication unit that transmits distance information indicative of an estimated distance based on a destination input into a navigation apparatus that is mounted in the consumption apparatus. In an example embodiment, a navigation apparatus is mounted in the consumption apparatus and provides destination information for transmission to the power storage control unit.

In another example embodiment, a power storage control method comprises connecting a consumption apparatus to a power supply; and transmitting information from the consumption apparatus to a power storage control unit when the consumption apparatus is connected to the power supply, wherein the transmitted information is configured to allow the power storage control unit to (a) determine an expected amount of power usage by the consumption apparatus, and (b) adjust a target value of power storage for a power storage apparatus based on the expected amount of power usage by the consumption apparatus. In an example embodiment, a connection state of the consumption apparatus with the power supply is one of (i) a wirelessly connected state, (ii) a directly connected state, and (iii) a not connected state. In an example embodiment, the consumption apparatus is configured to wirelessly connect to the power supply to perform a wireless power transfer. In an example embodiment, a wireless power supply connection is provided using inductive coupling. In an example embodiment, a wireless power supply connection is provided using resonant coupling. In an example embodiment, the consumption apparatus is configured to plug into to the power supply to perform a wired power transfer over a direct electrical connection. In an example embodiment, the expected amount of power usage is determined based on stored consumption amount information. In an example embodiment, the target value is adjusted when the consumption apparatus is separated from the power supply. In an example embodiment, the target value is adjusted based on schedule information of the consumption apparatus. In an example embodiment, the target value of power storage is adjusted by providing a control signal to the power storage apparatus. In an example embodiment, a connection state of the consumption apparatus with the power supply is monitored by a connection monitoring unit, wherein the power storage control unit receives data, from the connection monitoring unit, including at least a connection state of the consumption apparatus. In an example embodiment, a memory unit stores consumption amount information for the consumption apparatus. In an example embodiment, the expected amount of power usage is determined by using a value obtained based on a battery capacity of the consumption apparatus and a predetermined ratio. In an example embodiment, the target value is set based on a sum of a reference value indicative of the amount of power normally consumed by at least one household consumption apparatus and expected amount of power usage by the consumption apparatus. In an example embodiment, the target value is reset to a reference value indicative of the amount of power normally consumed by at least one household consumption apparatus when the consumption apparatus is in a connected state. In an example embodiment, a connection monitoring unit includes a history recording unit and a history analyzing unit, and the expected amount of power usage is determined based on a history of use of the consumption apparatus. In an example embodiment, the expected amount of power usage is determined using at least one of an average, a median, and a weighted average. In an example embodiment, the expected amount of power usage is determined based on a history of use of a specific user. In an example embodiment, a connection monitoring unit provides consumption apparatus information including identification information. In an example embodiment, a connection monitoring unit provides consumption amount information including at least one of a battery capacity, a battery consumption amount, and a remaining level of battery power. In an example embodiment, the power storage control method further comprises providing destination information to a destination information acquiring unit, wherein a consumption amount estimating unit estimates a battery consumption amount based on destination information acquired by the destination information acquiring unit. In an example embodiment, the destination information acquiring unit receives a transmission from a navigation apparatus mounted in the consumption apparatus. In an example embodiment, the destination information acquiring unit receives a transmission via at least one of a radio communication and power line communication. In an example embodiment, the consumption amount estimating unit calculates a distance between a location of the consumption apparatus and the power supply and calculates a battery consumption amount of the consumption apparatus by calculating the expected amount of power to be consumed by the consumption apparatus based on the distance. In an example embodiment, the power supply is configured to connect to a plurality of consumption apparatuses and the power storage control unit is configured to determine an expected amount of power usage for each of the plurality of consumption apparatuses. In an example embodiment, stored consumption amount information includes information for a working day and for a non-working day. In an example embodiment, the power storage apparatus is configured to receive power from power generation equipment that generates power from natural energy, the power generation equipment including at least one of a photovoltaic panel, wind power generation equipment, hydraulic power generation equipment, geothermal power generation equipment, and biomass power generation equipment. In an example embodiment, the power storage apparatus is configured to sell power stored in the power storage apparatus to a power company. In an example embodiment, the transmitted information includes at least one of apparatus information and capacity information. In an example embodiment, the capacity information includes at least one of battery capacity and a remaining level of the battery power. In an example embodiment, the apparatus information includes at least one of identification information specifying the battery and identification information specifying the consumption apparatus. In an example embodiment, the power storage control method further comprises calculating an amount of power consumed by the consumption apparatus prior to connecting to the power supply. In an example embodiment, the transmitted information includes user identification information for the consumption apparatus. In an example embodiment, the information is transmitted by power line communication. In an example embodiment, the consumption apparatus is at least one of an electric vehicle, an electric scooter, an electric bicycle, a cellular phone, a portable information terminal, and a portable battery. In an example embodiment, the consumption apparatus includes a driving unit, a battery, a connection unit, and an information supply unit. In an example embodiment, the transmitted information is transmitted by a radio communication unit that transmits distance information indicative of a distance between the location of the consumption apparatus and the power supply. In an example embodiment, the transmitted information is transmitted by a radio communication unit that transmits distance information indicative of a distance between the current location of the consumption apparatus and a destination input into a navigation apparatus that is mounted in the consumption apparatus. In an example embodiment, the transmitted information is transmitted by a radio communication unit that transmits distance information indicative of an estimated distance based on a destination input into a navigation apparatus that is mounted in the consumption apparatus. In an example embodiment, a navigation apparatus is mounted in the consumption apparatus and provides destination information for transmission to the power storage control unit.

In another example embodiment, a power storage control apparatus comprises a radio communication unit configured to receive radio communications from a consumption apparatus; and a power storage control unit configured to: (a) receive a radio communication from a consumption apparatus, (b) determine an expected amount of power usage by the consumption apparatus based on the received communication, and (c) adjust a target value of power storage for the power storage apparatus based on a the received communication and the expected amount of power usage by the consumption apparatus. In an example embodiment, a connection state of the consumption apparatus with a power supply is one of (i) a wirelessly connected state, (ii) a directly connected state, and (iii) a not connected state. In an example embodiment, the consumption apparatus is configured to wirelessly connect to a power supply to perform a wireless power transfer. In an example embodiment, a wireless power supply connection is provided using inductive coupling. In an example embodiment, a wireless power supply connection is provided using resonant coupling. In an example embodiment, the consumption apparatus is configured to plug into to a power supply to perform a wired power transfer over a direct electrical connection. In an example embodiment, the expected amount of power usage is determined based on stored consumption amount information. In an example embodiment, the target value is adjusted when the consumption apparatus is separated from a power supply. In an example embodiment, the target value is adjusted based on schedule information of the consumption apparatus. In an example embodiment, the target value of power storage is adjusted by providing a control signal to the power storage apparatus. In an example embodiment, the power storage control apparatus further comprises a connection monitoring unit for monitoring a connection state of the consumption apparatus with a power supply, wherein the power storage control unit receives data, from the connection monitoring unit, including at least a connection state of the consumption apparatus. In an example embodiment, the power storage control apparatus further comprises a memory unit storing consumption amount information for the consumption apparatus. In an example embodiment, the expected amount of power usage is determined by using a value obtained based on a battery capacity of the consumption apparatus and a predetermined ratio. In an example embodiment, the target value is set based on a sum of a reference value indicative of the amount of power normally consumed by at least one household consumption apparatus and expected amount of power usage by the consumption apparatus. In an example embodiment, the target value is reset to a reference value indicative of the amount of power normally consumed by at least one household consumption apparatus when the consumption apparatus is in a connected state. In an example embodiment, a connection monitoring unit includes a history recording unit and a history analyzing unit, and the expected amount of power usage is determined based on a history of use of the consumption apparatus. In an example embodiment, the expected amount of power usage is determined using at least one of an average, a median, and a weighted average. In an example embodiment, the expected amount of power usage is determined based on a history of use of a specific user. In an example embodiment, a connection monitoring unit provides consumption apparatus information including identification information. In an example embodiment, a connection monitoring unit provides consumption amount information including at least one of a battery capacity, a battery consumption amount, and a remaining level of battery power. In an example embodiment, the power storage control apparatus further comprises a destination information acquiring unit; and a consumption amount estimating unit that estimates a battery consumption amount based on destination information acquired by the destination information acquiring unit. In an example embodiment, the destination information acquiring unit receives a transmission from a navigation apparatus mounted in the consumption apparatus. In an example embodiment, the destination information acquiring unit receives a transmission via at least one of a radio communication and power line communication. In an example embodiment, the consumption amount estimating unit calculates a distance between a location of the consumption apparatus and the power supply and calculates a battery consumption amount of the consumption apparatus by calculating the expected amount of power to be consumed by the consumption apparatus based on the distance. In an example embodiment, a power supply is configured to connect to a plurality of consumption apparatuses and the power storage control unit is configured to determine an expected amount of power usage for each of the plurality of consumption apparatuses. In an example embodiment, stored consumption amount information includes information for a working day and for a non-working day. In an example embodiment, the power storage apparatus is configured to receive power from power generation equipment that generates power from natural energy, the power generation equipment including at least one of a photovoltaic panel, wind power generation equipment, hydraulic power generation equipment, geothermal power generation equipment, and biomass power generation equipment. In an example embodiment, the power storage apparatus is configured to sell power stored in the power storage apparatus to a power company. In an example embodiment, the consumption apparatus includes an information supply unit configured to transmit information from the consumption apparatus to a power storage control unit, and wherein the transmitted information includes at least one of apparatus information and capacity information. In an example embodiment, the capacity information includes at least one of battery capacity and a remaining level of the battery power. In an example embodiment, the apparatus information includes at least one of identification information specifying the battery and identification information specifying the consumption apparatus. In an example embodiment, the consumption apparatus includes an information supply unit configured to transmit information from the consumption apparatus to a power storage control unit, and wherein the information supply unit calculates an amount of power consumed by the consumption apparatus prior to transmitting information to the power storage control unit. In an example embodiment, the consumption apparatus includes an information supply unit configured to transmit information from the consumption apparatus to a power storage control unit, and wherein the information supply unit transmits user identification information for the consumption apparatus. In an example embodiment, the consumption apparatus is at least one of an electric vehicle, an electric scooter, an electric bicycle, a cellular phone, a portable information terminal, and a portable battery. In an example embodiment, the consumption apparatus includes a driving unit, a battery, a connection unit, and an information supply unit. In an example embodiment, the radio communication unit receives distance information indicative of a distance between the location of the consumption apparatus and a power supply. In an example embodiment, the radio communication unit receives distance information indicative of a distance between the current location of the consumption apparatus and a destination input into a navigation apparatus that is mounted in the consumption apparatus. In an example embodiment, the radio communication unit receives distance information indicative of an estimated distance based on a destination input into a navigation apparatus that is mounted in the consumption apparatus. In an example embodiment, a navigation apparatus is mounted in the consumption apparatus and provides destination information for transmission to the power storage control unit.

In another example embodiment, a power storage control method comprises receiving a radio communication from a consumption apparatus; determining an expected amount of power usage by the consumption apparatus based on the received communication; and adjusting a target value of power storage for the power storage apparatus based on a the received communication and the expected amount of power usage by the consumption apparatus. In an example embodiment, a connection state of the consumption apparatus with a power supply is one of (i) a wirelessly connected state, (ii) a directly connected state, and (iii) a not connected state. In an example embodiment, the consumption apparatus is configured to wirelessly connect to a power supply to perform a wireless power transfer. In an example embodiment, a wireless power supply connection is provided using inductive coupling. In an example embodiment, a wireless power supply connection is provided using resonant coupling. In an example embodiment, the consumption apparatus is configured to plug into to a power supply to perform a wired power transfer over a direct electrical connection. In an example embodiment, the expected amount of power usage is determined based on stored consumption amount information. In an example embodiment, the target value is adjusted when the consumption apparatus is separated from a power supply. In an example embodiment, the target value is adjusted based on schedule information of the consumption apparatus. In an example embodiment, the target value of power storage is adjusted by providing a control signal to the power storage apparatus. In an example embodiment, the power storage control method further comprises monitoring a connection state of the consumption apparatus with a power supply, and receiving data including at least a connection state of the consumption apparatus. In an example embodiment, the power storage control method further comprises storing consumption amount information for the consumption apparatus. In an example embodiment, the expected amount of power usage is determined by using a value obtained based on a battery capacity of the consumption apparatus and a predetermined ratio. In an example embodiment, the target value is set based on a sum of a reference value indicative of the amount of power normally consumed by at least one household consumption apparatus and expected amount of power usage by the consumption apparatus. In an example embodiment, the target value is reset to a reference value indicative of the amount of power normally consumed by at least one household consumption apparatus when the consumption apparatus is in a connected state. In an example embodiment, a connection monitoring unit includes a history recording unit and a history analyzing unit, and the expected amount of power usage is determined based on a history of use of the consumption apparatus. In an example embodiment, the expected amount of power usage is determined using at least one of an average, a median, and a weighted average. In an example embodiment, the expected amount of power usage is determined based on a history of use of a specific user. In an example embodiment, a connection monitoring unit provides consumption apparatus information including identification information. In an example embodiment, a connection monitoring unit provides consumption amount information including at least one of a battery capacity, a battery consumption amount, and a remaining level of battery power. In an example embodiment, the power storage control method further comprises acquiring destination information; and estimating a battery consumption amount based on the destination information. In an example embodiment, the destination information acquiring unit receives a transmission from a navigation apparatus mounted in the consumption apparatus. In an example embodiment, the destination information acquiring unit receives a transmission via at least one of a radio communication and power line communication. In an example embodiment, a distance between a location of the consumption apparatus and a power supply is calculated and a battery consumption amount of the consumption apparatus is calculated by calculating the expected amount of power to be consumed by the consumption apparatus based on the distance. In an example embodiment, a power supply is configured to connect to a plurality of consumption apparatuses and an expected amount of power usage for each of the plurality of consumption apparatuses is determined. In an example embodiment, stored consumption amount information includes information for a working day and for a non-working day. In an example embodiment, the power storage apparatus is configured to receive power from power generation equipment that generates power from natural energy, the power generation equipment including at least one of a photovoltaic panel, wind power generation equipment, hydraulic power generation equipment, geothermal power generation equipment, and biomass power generation equipment. In an example embodiment, the power storage apparatus is configured to sell power stored in the power storage apparatus to a power company. In an example embodiment, the consumption apparatus includes an information supply unit configured to transmit information from the consumption apparatus to a power storage control unit, and wherein the transmitted information includes at least one of apparatus information and capacity information. In an example embodiment, the capacity information includes at least one of battery capacity and a remaining level of the battery power. In an example embodiment, the apparatus information includes at least one of identification information specifying the battery and identification information specifying the consumption apparatus. In an example embodiment, the consumption apparatus includes an information supply unit configured to transmit information from the consumption apparatus to a power storage control unit, and wherein the information supply unit calculates an amount of power consumed by the consumption apparatus prior to transmitting information to the power storage control unit. In an example embodiment, the consumption apparatus includes an information supply unit configured to transmit information from the consumption apparatus to a power storage control unit, and wherein the information supply unit transmits user identification information for the consumption apparatus. In an example embodiment, the consumption apparatus is at least one of an electric vehicle, an electric scooter, an electric bicycle, a cellular phone, a portable information terminal, and a portable battery. In an example embodiment, the consumption apparatus includes a driving unit, a battery, a connection unit, and an information supply unit. In an example embodiment, the received communication includes distance information indicative of a distance between the location of the consumption apparatus and a power supply. In an example embodiment, the received communication includes distance information indicative of a distance between the current location of the consumption apparatus and a destination input into a navigation apparatus that is mounted in the consumption apparatus. In an example embodiment, the received communication includes distance information indicative of an estimated distance based on a destination input into a navigation apparatus that is mounted in the consumption apparatus. In an example embodiment, a navigation apparatus is mounted in the consumption apparatus and provides destination information for transmission to the power storage control unit.

In another example embodiment, a consumption apparatus comprises an information supply unit for determining consumption amount information; and a radio communication unit configured to transmit consumption amount information from the consumption apparatus via radio communication to a power storage control unit, wherein the transmitted consumption amount information is configured to allow the power storage control unit to (a) determine an expected amount of power usage by the consumption apparatus, and (b) adjust a target value of power storage for a power storage apparatus based on the expected amount of power usage by the consumption apparatus. In an example embodiment, a connection state of the consumption apparatus with a power supply is one of (i) a wirelessly connected state, (ii) a directly connected state, and (iii) a not connected state. In an example embodiment, the consumption apparatus is configured to wirelessly connect to a power supply to perform a wireless power transfer. In an example embodiment, a wireless power supply connection is provided using inductive coupling. In an example embodiment, a wireless power supply connection is provided using resonant coupling. In an example embodiment, the consumption apparatus is configured to plug into to a power supply to perform a wired power transfer over a direct electrical connection. In an example embodiment, the expected amount of power usage is determined based on stored consumption amount information. In an example embodiment, the target value is adjusted when the consumption apparatus is separated from a power supply. In an example embodiment, the target value is adjusted based on schedule information of the consumption apparatus. In an example embodiment, the target value of power storage is adjusted by providing a control signal to the power storage apparatus. In an example embodiment, a connection state of the consumption apparatus with a power supply is monitored by a connection monitoring unit, wherein the power storage control unit receives data, from the connection monitoring unit, including at least a connection state of the consumption apparatus. In an example embodiment, a memory unit stores consumption amount information for the consumption apparatus. In an example embodiment, the expected amount of power usage is determined by using a value obtained based on a battery capacity of the consumption apparatus and a predetermined ratio. In an example embodiment, the target value is set based on a sum of a reference value indicative of the amount of power normally consumed by at least one household consumption apparatus and expected amount of power usage by the consumption apparatus. In an example embodiment, the target value is reset to a reference value indicative of the amount of power normally consumed by at least one household consumption apparatus when the consumption apparatus is in a connected state. In an example embodiment, a connection monitoring unit includes a history recording unit and a history analyzing unit, and the expected amount of power usage is determined based on a history of use of the consumption apparatus. In an example embodiment, the expected amount of power usage is determined using at least one of an average, a median, and a weighted average. In an example embodiment, the expected amount of power usage is determined based on a history of use of a specific user. In an example embodiment, a connection monitoring unit provides consumption apparatus information including identification information. In an example embodiment, a connection monitoring unit provides consumption amount information including at least one of a battery capacity, a battery consumption amount, and a remaining level of battery power. In an example embodiment, the information supply unit provides destination information to a destination information acquiring unit, and a consumption amount estimating unit estimates a battery consumption amount based on destination information acquired by the destination information acquiring unit. In an example embodiment, the destination information acquiring unit receives a transmission from a navigation apparatus mounted in the consumption apparatus. In an example embodiment, the destination information acquiring unit receives a transmission via at least one of a radio communication and power line communication. In an example embodiment, the consumption amount estimating unit calculates a distance between a location of the consumption apparatus and a power supply and calculates a battery consumption amount of the consumption apparatus by calculating the expected amount of power to be consumed by the consumption apparatus based on the distance. In an example embodiment, a power supply is configured to connect to a plurality of consumption apparatuses and the power storage control unit is configured to determine an expected amount of power usage for each of the plurality of consumption apparatuses. In an example embodiment, stored consumption amount information includes information for a working day and for a non-working day. In an example embodiment, the power storage apparatus is configured to receive power from power generation equipment that generates power from natural energy, the power generation equipment including at least one of a photovoltaic panel, wind power generation equipment, hydraulic power generation equipment, geothermal power generation equipment, and biomass power generation equipment. In an example embodiment, the power storage apparatus is configured to sell power stored in the power storage apparatus to a power company. In an example embodiment, the transmitted consumption amount information includes at least one of apparatus information and capacity information. In an example embodiment, the capacity information includes at least one of battery capacity and a remaining level of the battery power. In an example embodiment, the apparatus information includes at least one of identification information specifying the battery and identification information specifying the consumption apparatus. In an example embodiment, the information supply unit calculates an amount of power consumed by the consumption apparatus prior to the radio communication unit transmitting the consumption amount information to the power supply. In an example embodiment, the information supply unit provides user identification information for the consumption apparatus. In an example embodiment, the consumption apparatus is at least one of an electric vehicle, an electric scooter, an electric bicycle, a cellular phone, a portable information terminal, and a portable battery. In an example embodiment, the consumption apparatus includes a driving unit, a battery, a connection unit, and an information supply unit. In an example embodiment, the radio communication unit transmits distance information indicative of a distance between the location of the consumption apparatus and a power supply. In an example embodiment, the radio communication unit transmits distance information indicative of a distance between the current location of the consumption apparatus and a destination input into a navigation apparatus that is mounted in the consumption apparatus. In an example embodiment, the radio communication unit transmits distance information indicative of an estimated distance based on a destination input into a navigation apparatus that is mounted in the consumption apparatus. In an example embodiment, a navigation apparatus is mounted in the consumption apparatus and provides destination information for transmission to the power storage control unit.

In another example embodiment, a power storage control method comprises determining consumption amount information; and transmitting the consumption amount information from the consumption apparatus via radio communication to a power storage control unit, wherein the transmitted consumption amount information is configured to allow the power storage control unit to (a) determine an expected amount of power usage by the consumption apparatus, and (b) adjust a target value of power storage for a power storage apparatus based on the expected amount of power usage by the consumption apparatus. In an example embodiment, a connection state of the consumption apparatus with a power supply is one of (i) a wirelessly connected state, (ii) a directly connected state, and (iii) a not connected state. In an example embodiment, the consumption apparatus is configured to wirelessly connect to a power supply to perform a wireless power transfer. In an example embodiment, a wireless power supply connection is provided using inductive coupling. In an example embodiment, a wireless power supply connection is provided using resonant coupling. In an example embodiment, the consumption apparatus is configured to plug into to a power supply to perform a wired power transfer over a direct electrical connection. In an example embodiment, the expected amount of power usage is determined based on stored consumption amount information. In an example embodiment, the target value is adjusted when the consumption apparatus is separated from a power supply. In an example embodiment, the target value is adjusted based on schedule information of the consumption apparatus. In an example embodiment, the target value of power storage is adjusted by providing a control signal to the power storage apparatus. In an example embodiment, a connection state of the consumption apparatus with a power supply is monitored by a connection monitoring unit, wherein the power storage control unit receives data, from the connection monitoring unit, including at least a connection state of the consumption apparatus. In an example embodiment, a memory unit stores consumption amount information for the consumption apparatus. In an example embodiment, the expected amount of power usage is determined by using a value obtained based on a battery capacity of the consumption apparatus and a predetermined ratio. In an example embodiment, the target value is set based on a sum of a reference value indicative of the amount of power normally consumed by at least one household consumption apparatus and expected amount of power usage by the consumption apparatus. In an example embodiment, the target value is reset to a reference value indicative of the amount of power normally consumed by at least one household consumption apparatus when the consumption apparatus is in a connected state. In an example embodiment, a connection monitoring unit includes a history recording unit and a history analyzing unit, and the expected amount of power usage is determined based on a history of use of the consumption apparatus. In an example embodiment, the expected amount of power usage is determined using at least one of an average, a median, and a weighted average. In an example embodiment, the expected amount of power usage is determined based on a history of use of a specific user. In an example embodiment, a connection monitoring unit provides consumption apparatus information including identification information. In an example embodiment, a connection monitoring unit provides consumption amount information including at least one of a battery capacity, a battery consumption amount, and a remaining level of battery power. In an example embodiment, the power storage control method further comprises providing destination information to a destination information acquiring unit, wherein a consumption amount estimating unit estimates a battery consumption amount based on destination information acquired by the destination information acquiring unit. In an example embodiment, the destination information acquiring unit receives a transmission from a navigation apparatus mounted in the consumption apparatus. In an example embodiment, the destination information acquiring unit receives a transmission via at least one of a radio communication and power line communication. In an example embodiment, the consumption amount estimating unit calculates a distance between a location of the consumption apparatus and a power supply and calculates a battery consumption amount of the consumption apparatus by calculating the expected amount of power to be consumed by the consumption apparatus based on the distance. In an example embodiment, a power supply is configured to connect to a plurality of consumption apparatuses and the power storage control unit is configured to determine an expected amount of power usage for each of the plurality of consumption apparatuses. In an example embodiment, stored consumption amount information includes information for a working day and for a non-working day. In an example embodiment, the power storage apparatus is configured to receive power from power generation equipment that generates power from natural energy, the power generation equipment including at least one of a photovoltaic panel, wind power generation equipment, hydraulic power generation equipment, geothermal power generation equipment, and biomass power generation equipment. In an example embodiment, the power storage apparatus is configured to sell power stored in the power storage apparatus to a power company. In an example embodiment, the transmitted consumption amount information includes at least one of apparatus information and capacity information. In an example embodiment, the capacity information includes at least one of battery capacity and a remaining level of the battery power. In an example embodiment, the apparatus information includes at least one of identification information specifying the battery and identification information specifying the consumption apparatus. In an example embodiment, the power storage control method further comprises calculating an amount of power consumed by the consumption apparatus prior to transmitting the consumption amount information to the power storage control unit. In an example embodiment, the transmitted information includes user identification information for the consumption apparatus. In an example embodiment, the consumption apparatus is at least one of an electric vehicle, an electric scooter, an electric bicycle, a cellular phone, a portable information terminal, and a portable battery. In an example embodiment, the consumption apparatus includes a driving unit, a battery, a connection unit, and an information supply unit. In an example embodiment, the transmitted consumption amount information is transmitted by a radio communication unit that transmits distance information indicative of a distance between the location of the consumption apparatus and the power supply. In an example embodiment, the transmitted consumption amount information is transmitted by a radio communication unit that transmits distance information indicative of a distance between the current location of the consumption apparatus and a destination input into a navigation apparatus that is mounted in the consumption apparatus. In an example embodiment, the transmitted consumption amount information is transmitted by a radio communication unit that transmits distance information indicative of an estimated distance based on a destination input into a navigation apparatus that is mounted in the consumption apparatus. In an example embodiment, a navigation apparatus is mounted in the consumption apparatus and provides destination information for transmission to the power storage control unit.

Remarks

The history recording unit 114 is examples of a consumption amount acquiring unit and a history retaining unit. The history analyzing unit 115 is an example of the consumption estimating unit. The radio communication unit 225 is an example of the transmission apparatus.

The preferred embodiments of the present technology have hitherto been described with reference to the accompanying drawings, but the present technology is not, of course, limited to the disclosed configuration examples. It should be apparent to those skilled in the art that the embodiments are modified or corrected in various forms within the scope of the appended claims, and it should be understood that the modified examples and the corrected examples pertain to the technical scope of the present technology.

For example, as in the above-described first embodiment, when the fixed battery consumption amount set for each apparatus or each battery capacity is used, the battery consumption amount may be switched by providing the battery consumption amounts on a working day and a non-working day or any other schedule information. Accordingly, a target value of the amount of power stored in the power storage apparatus may be adjusted based on schedule information of the consumption apparatus. For example, schedule information such as a work schedule may be provided to the system by a user. Further, as in the above-described second embodiment, when the use history is used, a method of calculating a total amount of average amounts of battery consumed in a day by a plurality of frequently used consumption apparatuses and controlling the power storage based on the total amount without using the use history of each apparatus may be considered. Furthermore, a method of charging the consumption apparatus 22 preferentially with the power stored in the power storage apparatus 14 is also effective.

It should be understood by those skilled in the art that various modifications, combinations, sub-combinations and alterations may occur depending on design requirements and other factors insofar as they are within the scope of the appended claims or the equivalents thereof.

The invention claimed is:
1. A power storage control apparatus comprising:
a first central processing unit (CPU) configured to:
(a) determine a connection state of a consumption apparatus with a power supply;
(b) determine an expected amount of power usage by the consumption apparatus in a connected state; and
(c) adjust a target value of power storage for a power storage apparatus based on a change in connection state and the expected amount of power usage by the consumption apparatus.

2. The power storage control apparatus of claim 1, wherein the connection state is one of (i) a wirelessly connected state, (ii) a directly connected state, and (iii) a not connected state.

3. The power storage control apparatus of claim 1, wherein the consumption apparatus is configured to wirelessly connect to the power supply to perform a wireless power transfer.

4. The power storage control apparatus of claim 3, wherein a wireless power supply connection is provided using inductive coupling.

5. The power storage control apparatus of claim 3, wherein a wireless power supply connection is provided using resonant coupling.

6. The power storage control apparatus of claim 1, wherein the consumption apparatus is configured to plug into the power supply to perform a wired power transfer over a direct electrical connection.

7. The power storage control apparatus of claim 1, wherein the expected amount of power usage is determined based on stored consumption amount information.

8. The power storage control apparatus of claim 1, wherein the target value is adjusted when the consumption apparatus is separated from the power supply.

9. The power storage control apparatus of claim 1, wherein the target value is adjusted based on schedule information of the consumption apparatus.

10. The power storage control apparatus of claim 1, wherein the target value of power storage is adjusted by providing a control signal to the power storage apparatus.

11. The power storage control apparatus of claim 1, wherein the first CPU is further configured to:
monitor a connection state of the consumption apparatus with the power supply, and
receive data including at least a connection state of the consumption apparatus.

12. The power storage control apparatus of claim 1, further comprising:
a memory configured to store consumption amount information for the consumption apparatus.

13. The power storage control apparatus of claim 1, wherein the expected amount of power usage is determined by using a value obtained based on a battery capacity of the consumption apparatus and a predetermined ratio.

14. The power storage control apparatus of claim 1, wherein the target value is set based on a sum of a reference value indicative of the amount of power normally consumed by at least one household consumption apparatus and expected amount of power usage by the consumption apparatus.

15. The power storage control apparatus of claim 1, wherein the target value is reset to a reference value indicative of the amount of power normally consumed by at least one household consumption apparatus when the consumption apparatus is in a connected state.

16. The power storage control apparatus of claim 1, wherein the first CPU is further configured to determine expected amount of power usage based on a history of use of the consumption apparatus.

17. The power storage control apparatus of claim 1, wherein the expected amount of power usage is determined using at least one of an average, a median, and a weighted average.

18. The power storage control apparatus of claim 1, wherein the expected amount of power usage is determined based on a history of use of a specific user.

19. The power storage control apparatus of claim 1, wherein the first CPU is further configured to provide consumption apparatus information including identification information.

20. The power storage control apparatus of claim 1, wherein the first CPU is configured to provide consumption amount information including at least one of a battery capacity, a battery consumption amount, and a remaining level of battery power.

21. The power storage control apparatus of claim 1, wherein the first CPU is further configured to acquire a destination information and estimate a battery consumption amount based on the acquired destination information.

22. The power storage control apparatus of claim 21, wherein the first CPU is configured to receive a transmission from a navigation apparatus mounted in the consumption apparatus.

23. The power storage control apparatus of claim 21, wherein the first CPU is further configured to receive a transmission via at least one of a radio communication and power line communication.

24. The power storage control apparatus of claim 21, wherein the first CPU is further configured to calculate a distance between a location of the consumption apparatus and the power supply and calculate a battery consumption amount of the consumption apparatus by calculating the expected amount of power to be consumed by the consumption apparatus based on the distance.

25. The power storage control apparatus of claim 1, wherein the power supply is configured to connect to a plurality of consumption apparatuses and the first CPU is configured to determine an expected amount of power usage for each of the plurality of consumption apparatuses.

26. The power storage control apparatus of claim 1, wherein stored consumption amount information includes information for a working day and for a non-working day.

27. The power storage control apparatus of claim 1, wherein the power storage apparatus is configured to receive power from power generation equipment configured to generate power from natural energy, the power generation equipment including at least one of a photovoltaic panel, wind power generation equipment, hydraulic power generation equipment, geothermal power generation equipment, and biomass power generation equipment.

28. The power storage control apparatus of claim 1, wherein the power storage apparatus is configured to sell power stored in the power storage apparatus to a power company.

29. The power storage control apparatus of claim 1, wherein the consumption apparatus includes a second CPU configured to transmit information from the consumption apparatus to the first CPU when the consumption apparatus is connected to the power supply, and wherein the transmitted information includes at least one of apparatus information and capacity information.

30. The power storage control apparatus of claim 29, wherein the capacity information includes at least one of battery capacity and a remaining level of the battery power.

31. The power storage control apparatus of claim 29, wherein the apparatus information includes at least one of identification information specifying a battery and identification information specifying the consumption apparatus.

32. The power storage control apparatus of claim 1, wherein the consumption apparatus includes a second CPU configured to transmit information from the consumption apparatus to the first CPU when the consumption apparatus is connected to the power supply, and
> wherein the second CPU is further configured to calculate an amount of power consumed by the consumption apparatus prior to connecting to the power supply.

33. The power storage control apparatus of claim 1, wherein the consumption apparatus includes a second CPU configured to transmit information from the consumption apparatus to the first CPU when the consumption apparatus is connected to the power supply, and wherein the second CPU is further configured to transmit user identification information for the consumption apparatus.

34. The power storage control apparatus of claim 1, wherein the consumption apparatus includes a second CPU configured to transmit information from the consumption apparatus to the first CPU when the consumption apparatus is connected to the power supply, and wherein the second CPU is configured to transmit the information by power line communication.

35. The power storage control apparatus of claim 1, wherein the consumption apparatus is at least one of an electric vehicle, an electric scooter, an electric bicycle, a cellular phone, a portable information terminal, and a portable battery.

36. The power storage control apparatus of claim 1, wherein the consumption apparatus includes a battery and a second CPU.

37. The power storage control apparatus of claim 1, further comprising:
> a radio communication receiver configured to receive distance information indicative of a distance between the location of the consumption apparatus and the power supply.

38. The power storage control apparatus of claim 1, further comprising:
> a radio communication receiver configured to receive distance information indicative of a distance between the current location of the consumption apparatus and a destination input into a navigation apparatus that is mounted in the consumption apparatus.

39. The power storage control apparatus of claim 1, further comprising:
> a radio communication receiver configured to receive distance information indicative of an estimated distance based on a destination input into a navigation apparatus that is mounted in the consumption apparatus.

40. The power storage control apparatus of claim 1, wherein a navigation apparatus is mounted in the consumption apparatus and is configured to provide destination information for transmission to the first CPU.

* * * * *